United States Patent
Hsu et al.

(10) Patent No.: US 8,709,136 B2
(45) Date of Patent: Apr. 29, 2014

(54) ADSORPTION PROCESS

(75) Inventors: Kuo-Kuang Hsu, Macungie, PA (US); Jonathan James Berg, Allentown, PA (US); Jianguo Xu, Wrightstown, PA (US); Edward Landis Weist, Jr., Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 196 days.

(21) Appl. No.: 13/438,560

(22) Filed: Apr. 3, 2012

(65) Prior Publication Data

US 2013/0255492 A1     Oct. 3, 2013

(51) Int. Cl.
*B01D 53/047* (2006.01)
*C01B 3/56* (2006.01)

(52) U.S. Cl.
CPC ............... *B01D 53/047* (2013.01); *C01B 3/56* (2013.01); *B01D 2256/16* (2013.01); *B01D 2257/504* (2013.01); *B01D 2259/40041* (2013.01); *B01D 2259/40043* (2013.01); *B01D 2259/40075* (2013.01); *B01D 2259/406* (2013.01)
USPC ................................... 95/98; 95/100; 95/103

(58) Field of Classification Search
CPC ............. B01D 53/047; B01D 2256/16; B01D 2257/504; B01D 2259/40041; B01D 2259/44043; B01D 2259/40075; B01D 2259/406; C01B 3/50; C01B 3/56
USPC ......................... 95/96–98, 100, 103
See application file for complete search history.

(56) References Cited

U.S. PATENT DOCUMENTS

| | | | |
|---|---|---|---|
| 4,171,206 A | 10/1979 | Sircar | |
| 4,299,596 A | 11/1981 | Benkman | |
| RE31,014 E | 8/1982 | Sircar | |
| 4,770,676 A | 9/1988 | Sircar et al. | |
| 4,790,858 A | 12/1988 | Sircar | |
| 4,840,647 A | 6/1989 | Hay | |
| 4,857,083 A | 8/1989 | DiMartino | |
| 4,861,351 A * | 8/1989 | Nicholas et al. | 95/93 |
| 4,869,894 A | 9/1989 | Wang et al. | |
| 4,913,709 A | 4/1990 | Kumar | |
| 4,915,711 A | 4/1990 | Kumar | |
| 4,963,339 A | 10/1990 | Krishnamurthy et al. | |
| 5,000,925 A | 3/1991 | Krishnamurthy et al. | |
| 5,026,406 A | 6/1991 | Kumar | |
| 5,051,115 A | 9/1991 | Leitgeb et al. | |
| 5,133,785 A | 7/1992 | Kumar et al. | |
| 5,248,322 A | 9/1993 | Kumar | |
| 5,354,346 A | 10/1994 | Kumar | |
| 6,245,127 B1 | 6/2001 | Kane et al. | |
| 6,565,628 B2 * | 5/2003 | Xu et al. | 95/100 |
| 7,306,651 B2 * | 12/2007 | Cieutat et al. | 95/97 |
| 7,491,260 B2 * | 2/2009 | Herb et al. | 95/96 |
| 7,550,030 B2 | 6/2009 | Kumar | |
| 7,618,478 B2 | 11/2009 | Kumar | |
| 7,740,688 B2 | 6/2010 | Kumar | |

* cited by examiner

*Primary Examiner* — Frank Lawrence, Jr.
(74) *Attorney, Agent, or Firm* — Bryan C. Hoke, Jr.

(57) ABSTRACT

A process for separating a first gas, for example $CO_2$, from a feed gas mixture comprising the first gas and a second gas, for example $H_2$, in five or more adsorption beds each containing an adsorbent selective for the first gas. The process comprises subjecting each of the adsorption beds to a repetitive cycle comprising, in sequence, (a) a feed step, (b) a rinse step, (c) a pressure decreasing equalization step, (d) a blowdown step, (e) an evacuation step, (f) a pressure increasing equalization step, and (g) a repressurization step. The feed gas mixture may be a reformate from a steam-hydrocarbon reforming process.

16 Claims, 11 Drawing Sheets

FIG. 14

| feed | eq1d | eq2d | fuel | bd | evac | | | eq2r | eq1r | repr |
|---|---|---|---|---|---|---|---|---|---|---|
| eq1r | repr | feed | | eq1d | eq2d | fuel | bd | evac | | eq2r |
| evac | | eq2r | eq1r | repr | feed | | eq1d | eq2d | fuel | bd |
| fuel | bd | evac | | | eq2r | eq1r | repr | feed | | eq1d |
| eq1d | eq2d | fuel | bd | evac | | | eq2r | eq1r | repr | feed |
FIG. 16 – *Comparative Cycle*
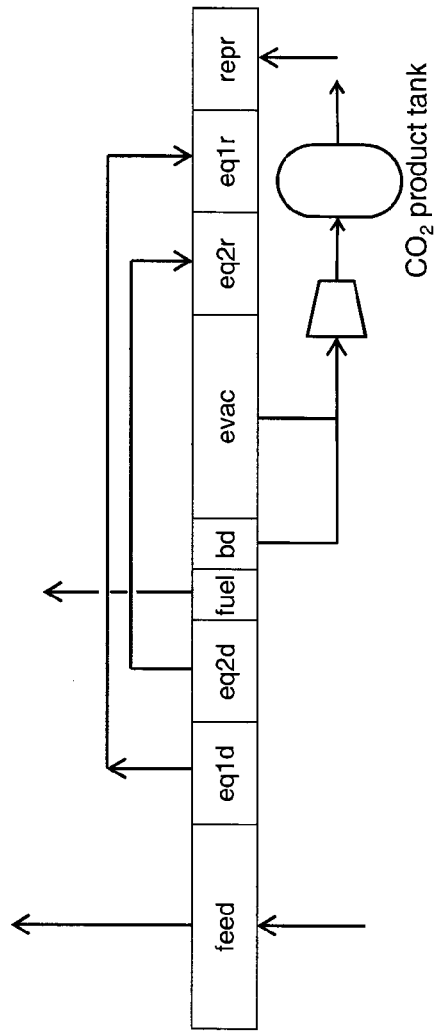
FIG. 17 – *Comparative Cycle*

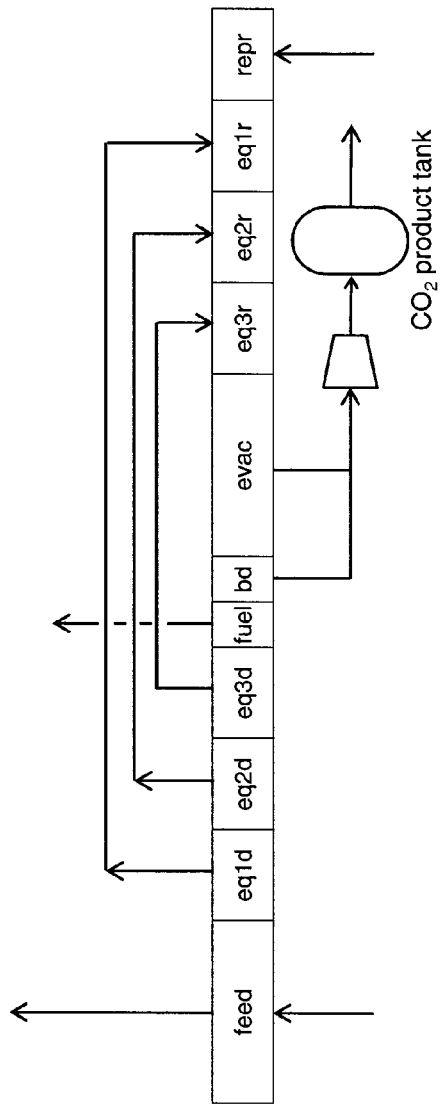
FIG. 18 - Comparative Cycle
FIG. 19 - Comparative Cycle

ADSORPTION PROCESS

BACKGROUND

The production of hydrogen by the steam reforming of hydrocarbons is well known. In the basic process, a hydrocarbon, or a mixture of hydrocarbons, is initially treated to remove trace contaminants such as sulfur and olefins, which would adversely affect the reformer catalyst.

The pretreated hydrocarbon is typically compressed, e.g. to about 1.5 MPa to 3 MPa, and combined with high pressure steam, which is at about 5 MPa, before entering the reformer furnace. The reformer itself conventionally contains tubes packed with catalyst through which the steam/hydrocarbon mixture passes. An elevated temperature, e.g. about 860° C. is maintained to drive the reaction which is endothermic.

The effluent from the reformer furnace is principally $H_2$, CO, and $CO_2$ in proportion close to equilibrium amounts at the furnace temperature and pressure with a minor amount of methane. The reformate is conventionally introduced into a one- or two-stage shift reactor to form additional $H_2$ and $CO_2$. The shift reactor converts the CO to $CO_2$ with the liberation of additional hydrogen by reaction at high temperature in the presence of steam. The combination of hydrocarbon/steam reformer and shift converter is well-known to those of ordinary skill in the art.

Various processes have been proposed to separate the effluent from the shift converter to recover hydrogen and $CO_2$ therefrom.

In one such method, the shift converter effluent, which comprises $H_2$, $CO_2$, and $H_2O$ with minor quantities of $CH_4$ and CO, is introduced into a chemical solvent-based adsorption unit selective for $CO_2$. Such a unit operates on the well-known amine wash or Benfield processes wherein $CO_2$ is removed from the effluent by dissolution in an absorbent solution, i.e. an amine solution or potassium carbonate solution, respectively. Conventionally, such units removed about 95 percent of the $CO_2$ in the shift converter effluent.

In another method, cyclic pressure swing adsorption (PSA) systems or cyclic vacuum pressure swing (VPSA) systems are being employed to remove $CO_2$ from shifted reformate streams. These systems are designed to fractionate gaseous mixtures by selective adsorption wherein the gaseous mixture is passed through a plurality of adsorption columns containing adsorbent beds which selectively retain $CO_2$.

The present invention relates to $CO_2$ separation by vacuum pressure swing adsorption techniques.

Related disclosures include U.S. Pat. Nos. 4,171,206, 4,299,596, 4,770,676, 4,790,858, 4,840,647, 4,857,083, 4,869,894, 4,913,709, 4,915,711, 4,963,339, 5,000,925, 5,026,406, 5,051,115, 5,133,785, 5,248,322, 5,354,346, 6,245,127, 7,550,030, 7,618,478, 7,740,688, and U.S. Pat. No. RE31014, each incorporated herein by reference.

$CO_2$ produced in accordance with the present invention may be used for any desired purpose. For example, $CO_2$ produced can be used for liquefaction to produce food-grade quality product(s), supercritical $CO_2$ for enhanced oil recovery or simply $CO_2$ for sequestration to avoid additional green house gases in the atmosphere in order to satisfy regulatory requirements.

Industry desires to separate $CO_2$ from high pressure $CO_2$-containing streams, for example reformate streams having a pressure ranging from 1 MPa to 7 MPa.

Industry desires increased recovery of $CO_2$. Industry desires a $CO_2$ recovery of greater than 90 mole %.

Industry desires high $CO_2$ purity. Industry desires a $CO_2$ purity in the $CO_2$ product stream of at least 95 mole % on a dry basis.

Industry desires high $CO_2$ purity from an adsorption system where no further purification other than condensation of water is required.

Industry desires to reduce compression costs for adsorption processes that separate $CO_2$ from $CO_2$-containing mixtures using pressure swing adsorption techniques.

BRIEF SUMMARY

The present invention relates to a process for separating a first gas from a feed gas mixture comprising the first gas and a second gas in a plurality of at least five adsorption beds each containing an adsorbent selective for the first gas. There are several aspects of the process as outlined below.

Aspect 1—A process comprising subjecting each of the adsorption beds to a repetitive cycle comprising, in sequence, (a) a feed step, (b) a rinse step, (c) a pressure decreasing equalization step, (d) a blowdown step, (e) an evacuation step, (f) a pressure increasing equalization step, and (g) a repressurization step, wherein:

the feed step (a) comprises introducing the feed gas mixture at a feed gas pressure ranging from 1 MPa to 7 MPa into an adsorption bed undergoing the feed step and adsorbing the first gas on the adsorbent in the adsorption bed undergoing the feed step while simultaneously withdrawing an effluent gas depleted in the first gas from the adsorption bed undergoing the feed step;

the rinse step (b) comprises co-currently introducing a rinse gas comprising the first gas at a rinse gas pressure ranging from 0.5 to 1 times the feed gas pressure or at a rinse gas pressure ranging from 0.5 to 0.8 times the feed gas pressure into an adsorption bed undergoing the rinse step while simultaneously co-currently withdrawing a rinse gas effluent from the adsorption bed undergoing the rinse step;

the pressure decreasing equalization step (c) comprises co-currently withdrawing a pressure equalization gas from an adsorption bed undergoing the pressure decreasing equalization step, and passing the pressure equalization gas to an adsorption bed undergoing the pressure increasing equalization step thereby equalizing the pressure between the adsorption bed undergoing the pressure decreasing equalization step and the adsorption bed undergoing the pressure increasing equalization step;

the blowdown step (d) comprises withdrawing a blowdown gas from an adsorption bed undergoing the blowdown step and compressing the blowdown gas to increase the pressure of the blowdown gas thereby forming the rinse gas for the adsorption bed undergoing the rinse step;

the evacuation step (e) comprises withdrawing a product stream comprising the first gas from an adsorption bed undergoing the evacuation step at an evacuation pressure sufficient to desorb the first gas for forming the product stream and compressing the product stream to increase the pressure of the product stream;

the pressure increasing equalization step (f) comprises counter-currently introducing the pressure equalization gas from the adsorption bed undergoing the pressure decreasing equalization step into the adsorption bed undergoing the pressure increasing equalization step; and the repressurization step (g) comprises increasing the pressure in an adsorption bed undergoing the repressurization step until the adsorption bed undergoing the repressurization step is substantially at the feed gas pressure, by at least one of (g1) co-currently introducing the feed gas mixture into the adsorption bed undergoing the repressurization step, and (g2) counter-currently introducing a portion of the effluent gas depleted in the first gas from the adsorption bed undergoing the feed step into the adsorption bed undergoing the repressurization step.

Aspect 2—The process of aspect 1 wherein the first gas is $CO_2$ and the second gas is $H_2$.

Aspect 3—The process of aspect 2 wherein the feed gas mixture further comprises CO.

Aspect 4—The process of aspect 3 wherein the feed gas mixture comprises 50 mole % to 90 mole % $H_2$, 1 mole % to 15 mole % $CH_4$, 10 mole % to 25 mole % $CO_2$, and 1 mole % to 10 mole % CO.

Aspect 5—The process of any one of aspects 1-4 wherein the evacuation pressure ranges from 7 kPa to 95 kPa or from 7 kPa to 50 kPa.

Aspect 6—The process of any one of aspects 1-5 wherein the feed gas pressure ranges from 1.8 MPa to 3.6 MPa.

Aspect 7—The process of any one of aspects 1-6 wherein the blowdown gas is withdrawn from the adsorption bed undergoing the blowdown step until the pressure in the adsorption bed undergoing the blowdown step reaches a blowdown pressure ranging from 100 kPa to 500 kPa or from 100 kPa to 200 kPa.

Aspect 8—The process of any one of aspects 1-7 wherein the blowdown gas in blowdown step (d) is withdrawn co-currently from the adsorption bed undergoing the blowdown step.

Aspect 9—The process of any one of aspects 1-7 wherein the blowdown gas in blowdown step (d) is withdrawn counter-currently from the adsorption bed undergoing the blowdown step.

Aspect 10—The process of any one of aspects 1-7 wherein the blowdown gas in blowdown step (d) is withdrawn co-currently and counter-currently from the adsorption bed undergoing the blowdown step.

Aspect 11—The process of any one of aspects 1-10 wherein the product stream in evacuation step (e) is withdrawn co-currently from the adsorption bed undergoing the evacuation step.

Aspect 12—The process of any one of aspects 1-10 wherein the product stream in evacuation step (e) is withdrawn counter-currently from the adsorption bed undergoing the evacuation step.

Aspect 13—The process of any one of aspects 1-10 wherein the product stream in evacuation step (e) is withdrawn co-currently and counter-currently from the adsorption bed undergoing the evacuation step.

Aspect 14—The process of any one of aspects 1-13 further comprising a rinse gas effluent equalization step, wherein the rinse gas effluent equalization step is after the pressure increasing equalization step (f) and before repressurization step (g) in the repetitive cycle, wherein:
the rinse gas effluent equalization step comprises counter-currently introducing at least a portion of the rinse gas effluent from the adsorption bed undergoing the rinse step into an adsorption bed undergoing the rinse gas effluent equalization step.

Aspect 15—The process of any one of aspects 1-13 further comprising a rinse gas effluent equalization step, wherein the rinse gas effluent equalization step is after the pressure increasing equalization step (f) and before repressurization step (g) in the repetitive cycle, wherein:
the rinse gas effluent equalization step comprises counter-currently introducing at least a portion of the rinse gas effluent from the adsorption bed undergoing the rinse step into an adsorption bed undergoing the rinse gas effluent equalization step while simultaneously at least one of (i) co-currently introducing the feed gas into the adsorption bed undergoing the rinse gas effluent equalization step, and (ii) counter-currently introducing a portion of the effluent gas from the adsorption bed undergoing the feed step into the adsorption bed undergoing the rinse gas effluent equalization step.

Aspect 16—The process of any one of aspects 1-15 further comprising a second pressure decreasing equalization step and a second pressure increasing equalization step, wherein the second pressure decreasing equalization step is after the pressure decreasing equalization step (c) and before the blowdown step (d) in the repetitive cycle, wherein the second pressure increasing equalization step is after the evacuation step (e) and before the pressure increasing equalization step (f) in the repetitive cycle, wherein:
the second pressure decreasing equalization step comprises co-currently withdrawing a second pressure equalization gas from an adsorption bed undergoing the second pressure decreasing equalization step, and passing the second pressure equalization gas to an adsorption bed undergoing the second pressure increasing equalization step thereby equalizing the pressure between the adsorption bed undergoing the second pressure decreasing equalization step and the adsorption bed undergoing the second pressure increasing equalization step; and
the second pressure increasing equalization step comprises counter-currently introducing the second pressure equalization gas from the adsorption bed undergoing the second pressure decreasing equalization step into the adsorption bed undergoing the second pressure increasing equalization step.

Aspect 17—The process of aspect 16 further comprising a third pressure decreasing equalization step and a third pressure increasing equalization step, wherein the third pressure decreasing equalization step is after the second pressure decreasing equalization step and before the blowdown step (d) in the repetitive cycle, wherein the third pressure increasing equalization step is after the evacuation step (e) and before the second pressure increasing equalization step, wherein:
the third pressure decreasing equalization step comprises co-currently withdrawing a third pressure equalization gas from an adsorption bed undergoing the third pressure decreasing equalization step, and passing the third pressure equalization gas to an adsorption bed undergoing the third pressure increasing equalization step thereby equalizing the pressure between the adsorption bed undergoing the third pressure decreasing equalization step and the adsorption bed undergoing the third pressure increasing equalization step; and
the third pressure increasing equalization step comprises counter-currently introducing the third pressure equalization gas from the adsorption bed undergoing the third pressure decreasing equalization step into the adsorption bed undergoing the third pressure increasing equalization step.

Aspect 18—The process of aspect 17 further comprising a fourth pressure decreasing equalization step and a fourth pressure increasing equalization step, wherein the fourth pressure decreasing equalization step is after the third pressure decreasing equalization step and before the blowdown step (d) in the repetitive cycle, wherein the fourth pressure increasing equalization step is after the evacuation step (e) and before the third pressure increasing equalization step, wherein:

the fourth pressure decreasing equalization step comprises co-currently withdrawing a fourth pressure equalization gas from an adsorption bed undergoing the fourth pressure decreasing equalization step, and passing the fourth pressure equalization gas to an adsorption bed undergoing the fourth pressure increasing equalization step thereby equalizing the pressure between the adsorption bed undergoing the fourth pressure decreasing equalization step and the adsorption bed undergoing the fourth pressure increasing equalization step; and the fourth pressure increasing equalization step comprises counter-currently introducing the fourth pressure equalization gas from the adsorption bed undergoing the fourth pressure decreasing equalization step into the adsorption bed undergoing the fourth pressure increasing equalization step.

Aspect 19—The process of any one of aspects 1-15 further comprising a second pressure decreasing equalization step and a second pressure increasing equalization step, wherein the second pressure decreasing equalization step is after the feed step (a) and before the rinse step (b) in the repetitive cycle, wherein the second pressure increasing equalization step is after the pressure increasing equalization step and before the repressurization step (g) in the repetitive cycle, wherein:

the second pressure decreasing equalization step comprises co-currently withdrawing a second pressure equalization gas from an adsorption bed undergoing the second pressure decreasing equalization step, and passing the second pressure equalization gas to an adsorption bed undergoing the second pressure increasing equalization step thereby equalizing the pressure between the adsorption bed undergoing the second pressure decreasing equalization step and the adsorption bed undergoing the second pressure increasing equalization step; and the second pressure increasing equalization step comprises counter-currently introducing the second pressure equalization gas from the adsorption bed undergoing the second pressure decreasing equalization step while simultaneously at least one of (i) co-currently introducing the feed gas into the adsorption bed undergoing the second pressure increasing equalization step, and (ii) counter-currently introducing a portion of the effluent gas from the adsorption bed undergoing the feed step into the adsorption bed undergoing the second pressure increasing equalization step.

Aspect 20—The process of aspect 19 further comprising a third pressure decreasing equalization step and a third pressure increasing equalization step, wherein the third pressure decreasing equalization step is after the second pressure decreasing equalization step and before the blowdown step (d) in the repetitive cycle, wherein the third pressure increasing equalization step is after the evacuation step (e) and before the second pressure increasing equalization step in the repetitive cycle, wherein:

the third pressure decreasing equalization step comprises co-currently withdrawing a third pressure equalization gas from an adsorption bed undergoing the third pressure decreasing equalization step, and passing the third pressure equalization gas to an adsorption bed undergoing the third pressure increasing equalization step thereby equalizing the pressure between the adsorption bed undergoing the third pressure decreasing equalization step and the adsorption bed undergoing the third pressure increasing equalization step; and the third pressure increasing equalization step comprises counter-currently introducing the third pressure equalization gas from the adsorption bed undergoing the third pressure decreasing equalization step into the adsorption bed undergoing the third pressure increasing equalization step.

Aspect 21—The process of aspect 20 further comprising a fourth pressure decreasing equalization step and a fourth pressure increasing equalization step, wherein the fourth pressure decreasing equalization step is after the third pressure decreasing equalization step and before the blowdown step (d) in the repetitive cycle, wherein the fourth pressure increasing equalization step is after the evacuation step (e) and before the third pressure increasing equalization step, wherein:

the fourth pressure decreasing equalization step comprises co-currently withdrawing a fourth pressure equalization gas from an adsorption bed undergoing the fourth pressure decreasing equalization step, and passing the fourth pressure equalization gas to an adsorption bed undergoing the fourth pressure increasing equalization step thereby equalizing the pressure between the adsorption bed undergoing the fourth pressure decreasing equalization step and the adsorption bed undergoing the fourth pressure increasing equalization step; and the fourth pressure increasing equalization step comprises counter-currently introducing the fourth pressure equalization gas from the adsorption bed undergoing the fourth pressure decreasing equalization step into the adsorption bed undergoing the fourth pressure increasing equalization step.

Aspect 22—The process of any one of aspects 17, 18, 20 or 21 further comprising a provide purge step and a purge step, wherein the provide purge step is after the third pressure decreasing equalization step or the fourth pressure decreasing equalization step and before the blowdown step (d) in the repetitive cycle, wherein the purge step is after the evacuation step (e) and before the third pressure increasing equalization step or the fourth pressure increasing equalization step, wherein:

the provide purge step comprises co-currently withdrawing a purge gas from an adsorption bed undergoing the provide purge step, and passing the purge gas to an adsorption bed undergoing the purge step; and the purge step comprises counter-currently introducing the purge gas from the adsorption bed undergoing the provide purge step into the adsorption bed undergoing the purge step while counter-currently withdrawing a purge gas effluent comprising the first gas from the adsorption bed undergoing the purge step at the evacuation pressure and combining the purge gas with the product stream.

Aspect 23—The process of aspect 22 wherein the provide purge step further comprises co-currently introducing rinse gas simultaneously with the withdrawing of the purge gas.

Aspect 24—The process of any one of aspects 1-23 wherein increasing the pressure in the adsorption bed undergoing the repressurization step (g) further comprises counter-currently introducing at least a portion of the rinse gas effluent from the adsorption bed undergoing the rinse step.

Aspect 25—The process of any one of aspects 1-24 wherein the blowdown gas is not blended with the feed gas mixture.

Aspect 26—The process of any one of aspects 1-25 wherein none of the at least five adsorption beds are subjected to a pressure equalization step with an adsorption bed not subjected to the repetitive cycle.

Aspect 27—The process of any one of aspects 1-26 wherein the repressurization step does not comprise introducing an effluent gas from an adsorption bed which is not subjected to the repetitive cycle.

Aspect 28—The process of any one of aspects 1-27 wherein two or more of the adsorption beds are contemporaneously undergoing the evacuation step.

BRIEF DESCRIPTION OF SEVERAL VIEWS OF THE DRAWINGS

FIG. 14 is a cycle chart for a 12 bed adsorption cycle.

FIG. 16 is a cycle chart for a comparative 5 bed adsorption cycle.

FIG. 7 is a schematic illustrating the relationship of gas flows for the cycle chart of FIG. 16.

FIG. 18 is a cycle chart for a comparative 6 bed adsorption cycle.

FIG. 19 is a schematic illustrating the relationship of gas flows for the cycle chart of FIG. 18.

DETAILED DESCRIPTION

Figure 1:
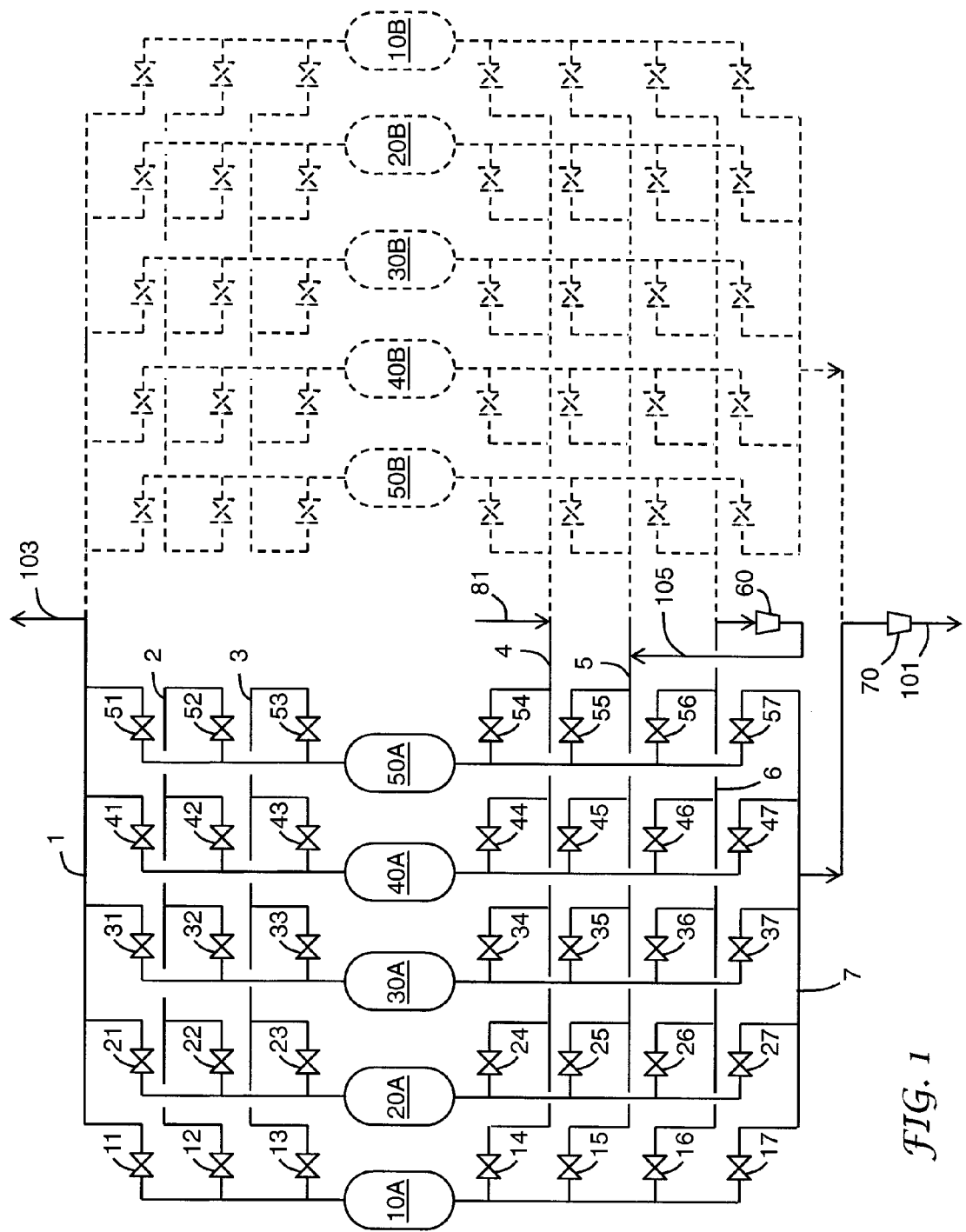
FIG. 1 is a process flow diagram for an exemplary 5 bed adsorption system.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list.

The phrase "at least a portion" means "a portion or all." The at least a portion of a stream may have the same composition as the stream from which it is derived. The at least a portion of a stream may include specific components of the stream from which it is derived.

As used herein, concentration percentages are mole percent.

Pressures are absolute pressures unless specifically indicated to be gauge pressures.

The present process is an adsorption process for separating a first gas from a feed gas mixture comprising the first gas and a second gas. The first gas may be $CO_2$ and the second gas may be $H_2$. The feed gas mixture may further comprise a third gas. The third gas may be CO. The feed gas mixture may be, for example, a reformate from a steam-hydrocarbon reforming process. The reformate may have been shifted in a shift reactor. The feed gas mixture as a reformate may comprise $CO_2$, $H_2$, $CH_4$, CO, and $H_2O$. The feed gas mixture may be provided to the adsorption process without first being processed in a $H_2$ PSA, where $H_2$ is removed from the reformate stream.

As vacuum pressure swing adsorption (VPSA) processes are well-known, one of ordinary skill in the art can construct an adsorption system suitable for carrying out the process described herein. Suitable equipment for carrying out the process is well-known in the art. Operating conditions not specifically disclosed herein suitable for use in the process described herein may be determined by one skilled in the art without undue experimentation.

The process may be carried out in axial flow adsorbent beds or radial flow adsorbent beds.

Each of the adsorption beds has an "inlet end" and a "discharge end," so termed because of their function during the feed step (also called the adsorption step) of the adsorption cycle. A feed gas mixture is introduced into the "inlet end" of the adsorption bed and an effluent gas is withdrawn from the "discharge end" during the feed step of the cycle. During other steps of the adsorption cycle, gas may be introduced or withdrawn from "inlet end." Likewise, during other steps of the adsorption cycle, gas may be introduced or withdrawn from the "discharge end."

The adsorption process may be performed in a plurality of at least five adsorption beds. FIG. 1 shows a process flow diagram with adsorption beds 10A, 20A, 30A, 40A and 50A, for an example adsorption system suitable for a 5 bed cycle. FIG. 1 shows optional twin adsorption beds 10B, 20B, 30B, 40B, and 50B, which may operate in a manner complementary, for example 180° out of phase, with adsorption beds 10A, 20A, 30A, 40A and 50A. While FIG. 1 shows optional twin adsorption beds which may operate complementarily, the adsorption system may be configured to operate 3 or more adsorption beds complementarily, for example 120° (for 3 beds), 90° (for 4 beds), 72° (for 5 beds), 60° (for 6 beds) out of phase. A five adsorption bed cycle may operate with five adsorption beds, 10 adsorption beds, 15 adsorption beds, and so on. The benefit of operating multiple adsorption beds in cycles out of phase with each other is that it dampens the fluctuations of effluent streams and allows a single rinse gas compressor to be used for the multiple trains of adsorption beds.

By analogy, a 6 bed cycle may operate with 6 adsorption beds, 12 adsorption beds, 18 adsorption beds, and so on. Likewise, a 7 bed cycle may operate with 7 adsorption beds, 14 adsorption bed, 21 adsorption beds, and so on. The same pattern may be used for any adsorption cycle.

The adsorption process may be performed in a plurality of at least six adsorption beds, or at least seven adsorption beds, or at least eight adsorption beds, or at least nine adsorption beds, or at least ten adsorption beds. Any suitable number of adsorption beds may be used in the adsorption process, the maximum limited by practical and economic factors. The maximum number of adsorption beds may be 100, 1000, or 10,000.

Each of the adsorbent beds contains an adsorbent selective for the first gas. An adsorbent "selective" for a component means that the component is more strongly adsorbed on the adsorbent than other components. For the case where the first gas is $CO_2$, the adsorbent is selective for $CO_2$. Suitable $CO_2$ adsorbents are known in the art, for example, CaA, NaX, NaY, alumina, carbon, silica gel, and mixtures thereof.

The process comprises subjecting each of the adsorption beds to a repetitive cycle comprising, in sequence, (a) a feed step, (b) a rinse step, (c) a pressure decreasing equalization step, (d) a blowdown step, (e) an evacuation step, (f) a pressure increasing equalization step, and (g) a repressurization step.

The feed step (a) comprises introducing the feed gas mixture at a feed gas pressure ranging from 1 MPa to 7 MPa or from 1.8 MPa to 3.6 MPa into an adsorption bed undergoing the feed step and adsorbing the first gas on the adsorbent in the adsorption bed undergoing the feed step while simultaneously withdrawing an effluent gas depleted in the first gas from the adsorption bed undergoing the feed step. The feed step may occur over a time period of 30 seconds to 300 seconds. The feed step is represented by "feed" in the cycle charts shown in FIGS. 2-15.

The process may be carried out at a temperature ranging from 4° C. to 100° C.

The term "depleted" means having a lesser mole % concentration of the indicated gas than the original stream from which it was formed. "Depleted" does not mean that the stream is completely lacking the indicated gas.

The effluent gas during the feed step therefore has a lower mole % concentration of the first gas component than the feed gas mixture due to adsorption of the first gas on the adsorbent.

For the case where the feed gas mixture comprises $CO_2$ and $H_2$, the effluent gas withdrawn from the adsorption bed undergoing the feed step may be further processed in a pressure swing adsorption system to separate $H_2$ from the effluent gas.

At the end of the feed step, the adsorption bed contains what is called a void space gas which is a combination of both gas phase and adsorbed phase molecules. The void space gas has a higher average concentration of the more strongly adsorbable components than the feed gas mixture since the less adsorbable components were withdrawn as the effluent stream. The concentration of the various components of the void space gas mixture will generally vary as a function of distance from the inlet end to the discharge end of the adsorption bed. The void space gas near the discharge end will generally have a high concentration of weakly adsorbable components and non-adsorbable components. The void space gas near the inlet end will generally have a higher concentration of the more strongly adsorbable component (e.g. $CO_2$ for the case of $CO_2$ adsorption).

The direction of flow during other steps is typically described with reference to the direction of flow during the feed step. Thus gas flow in the same direction as the gas flow during the feed step is "co-current" and gas flow that is in the opposite direction to the gas flow during the feed step is "counter-current." Co-currently introducing a gas into an adsorption bed means to introduce the gas in the same direction as the gas flow during the feed step. Counter-currently introducing a gas into an adsorption bed means to introduce the gas in a direction counter-current to the direction of the gas flow during the feed step. Co-currently withdrawing a gas from an adsorption bed means to withdraw the gas in the same direction as the gas flow during the feed step. Counter-currently withdrawing a gas from an adsorption bed means to withdraw the gas in a direction counter-current to the direction of the gas flow during the feed step.

Gas may be simultaneously co-currently introduced to the inlet end and counter-currently introduced to the discharge end. Gas may be simultaneously co-currently withdrawn from discharge end and counter-currently withdrawn from the inlet end.

When gas is withdrawn from an intermediate position to the inlet end and the discharge end, a portion of the gas is co-currently withdrawn and a portion is counter-currently withdrawn. When gas is introduced to an intermediate position to the inlet end and the discharge end, a portion of the gas is co-currently introduced and a portion is counter-currently introduced.

The rinse step (b) comprises co-currently introducing a rinse gas comprising the first gas at a rinse gas pressure ranging from 0.5 to 1 times the feed gas pressure into an adsorption bed undergoing the rinse step while simultaneously co-currently withdrawing a rinse gas effluent from the adsorption bed undergoing the rinse step. The concentration of the first gas in the rinse gas is higher than the concentration of the first gas in the feed gas mixture. The benefit of providing a rinse gas having a higher concentration of the first gas than the first gas concentration in the feed gas mixture is that the resulting concentration of the first gas in the product stream is higher. The rinse gas effluent may be blended with the effluent gas from another adsorption bed undergoing the feed step. Rinse gas effluent may be used to increase the pressure in another adsorption bed. The rinse step may occur over a time period of 15 seconds to 300 seconds. The rinse step is represented by "rinse" in FIGS. 2-15.

The pressure decreasing equalization step (c) comprises co-currently withdrawing a pressure equalization gas from an adsorption bed undergoing the pressure decreasing equalization step, and passing the pressure equalization gas to an adsorption bed undergoing the pressure increasing equalization step thereby equalizing the pressure between the adsorption bed undergoing the pressure decreasing equalization step and the adsorption bed undergoing the pressure increasing equalization step. One or more pressure decreasing equalization steps may be used. The pressure decreasing equalization step (c) is represented by one of "eq1$d$," "eq2$d$," "eq3$d$," and "eq4$d$" in FIGS. 2-15, corresponding to an equalization step that takes place after the rinse step (b).

As defined herein, "equalizing the pressure" means that the pressure difference between the adsorption beds at the end of the step is less than 250 kPa (36 psi).

The blowdown step (d) comprises withdrawing a blowdown gas from an adsorption bed undergoing the blowdown step and compressing the blowdown gas to increase the pressure of the blowdown gas thereby forming the rinse gas for the adsorption bed undergoing the rinse step. The blowdown gas may be withdrawn from the adsorption bed undergoing the blowdown step until the pressure in the adsorption bed undergoing the blowdown step reaches a blowdown pressure ranging from 100 kPa to 500 kPa or from 100 kPa to 200 KPa. The blowdown gas may be compressed in any suitable compressor or the like. The concentration of the first gas in the blowdown gas increases as the blowdown step progresses and is higher than that of the feed gas mixture making it suitable as the rinse gas. The blowdown step is represented by "bd" in FIGS. 2-15.

The blowdown gas may be withdrawn co-currently and/or counter-currently from the adsorption bed undergoing the blowdown step.

A benefit of one or more equalization steps is that less blowdown gas is compressed to form the rinse gas, thereby saving compression energy. However, more equalization steps require more adsorption vessels for the cycle.

Because the equalization steps reduce the amount of blowdown gas, the blowdown step duration and/or rinse step duration can be reduced to half the feed step duration for better utilization of the adsorption beds without the risk of fluidization. The duration of the blowdown step may be about half the duration of the feed step. The duration of the blowdown step may be 0.3 to 1 times the duration of the feed step or may be 0.3 to 0.55 times the duration of the feed step.

The evacuation step (e) comprises counter-currently and/or co-currently withdrawing a product stream comprising the first gas from an adsorption bed undergoing the evacuation step at an evacuation pressure sufficient to desorb the first gas for forming the product stream and compressing the product stream to increase the pressure of the product stream. The evacuation pressure may range from 7 kPa to 95 kPa or from 7 kPa to 50 kPa. The product stream may be compressed in any suitable compressor, vacuum pump, or the like. The evacuation step is represented by "evac" in FIGS. 2-15. The compressed product stream may be passed to 1 or more surge tanks, if desired.

The pressure increasing equalization step (f) comprises counter-currently introducing the pressure equalization gas from the adsorption bed undergoing the pressure decreasing equalization step into the adsorption bed undergoing the pressure increasing equalization step. As stated in the pressure decreasing equalization step (c), the pressure is equalized between the adsorption bed undergoing the pressure decreasing equalization step and the adsorption bed undergoing the pressure increasing equalization step. One or more pressure increasing equalization steps may be used. The pressure increasing equalization step (f) is represented by one of "eq1$r$," "eq2$r$," "eq3$r$," and "eq4$r$" in FIGS. 2-15, corresponding to the step complementary to "eq1$d$," "eq2$d$," "eq3$d$," and "eq4$d$" pressure decreasing equalization step.

The repressurization step (g) comprises increasing the pressure in an adsorption bed undergoing the repressurization step until the adsorption bed undergoing the repressurization step is substantially at the feed gas pressure. The pressure may be increased by at least one of (g1) co-currently introducing the feed gas mixture into the adsorption bed undergoing the repressurization step, and (g2) counter-currently introducing a portion of the effluent gas depleted in the first gas from the adsorption bed undergoing the feed step into the adsorption bed undergoing the repressurization step. The repressurization step is represented by "repr" in FIGS. 2-15.

"Substantially at the feed gas pressure" means within 10% of the feed gas pressure.

The process may further comprise a rinse gas effluent equalization step, represented by "eqrinse" in FIGS. 2-11. The rinse gas effluent equalization step is after the pressure increasing equalization step (f) and before repressurization step (g) in the repetitive cycle.

The rinse gas effluent equalization step comprises counter-currently introducing at least a portion of the rinse gas effluent from the adsorption bed undergoing the rinse step into an adsorption bed undergoing the rinse gas effluent equalization step. The rinse step may occur at a pressure lower than the feed step and the rinse gas effluent may be used to increase the pressure of another bed without simultaneously introducing feed gas and without simultaneously introducing effluent gas from an adsorption bed undergoing a feed step.

The rinse gas effluent equalization step may further comprise at least one of (i) co-currently introducing the feed gas into the adsorption bed undergoing the rinse gas effluent equalization step, and (ii) counter-currently introducing a portion of the effluent gas from the adsorption bed undergoing the feed step into the adsorption bed undergoing the rinse gas effluent equalization step where the feed gas and/or effluent gas are introduced simultaneously with the rinse gas effluent.

The process may further comprise a second pressure decreasing equalization step and a second pressure increasing equalization step, wherein the second pressure decreasing equalization step is after the pressure decreasing equalization step (c) and before the blowdown step (d) in the repetitive cycle, and wherein the second pressure increasing equalization step is after the evacuation step (e) and before the pressure increasing equalization step (f) in the repetitive cycle.

As used herein, "first," "second," "third," and "fourth" are used to distinguish from among a plurality of pressure increasing equalization steps and does not indicate its relative position in time.

The second pressure decreasing equalization step, if present, comprises co-currently withdrawing a second pressure equalization gas from an adsorption bed undergoing the second pressure decreasing equalization step, and passing the second pressure equalization gas to an adsorption bed undergoing the second pressure increasing equalization step thereby equalizing the pressure between the adsorption bed undergoing the second pressure decreasing equalization step and the adsorption bed undergoing the second pressure increasing equalization step. The second pressure decreasing equalization step is represented by one of "eq1$d$," "eq2$d$," "eq3$d$," and "eq4$d$" in FIGS. 2-15, corresponding to an equalization step that takes place after the pressure decreasing equalization step (c) and before the blowdown step (d).

The second pressure increasing equalization step comprises counter-currently introducing the second pressure equalization gas from the adsorption bed undergoing the second pressure decreasing equalization step into the adsorption bed undergoing the second pressure increasing equalization step. The second pressure increasing equalization step is represented by one of "eq1$r$," "eq2$r$," "eq3$r$," and "eq4$r$" in FIGS. 2-15, corresponding to an equalization step that takes place after the evacuation step (e) and before the pressure increasing equalization step (f) and also corresponding to the step complementary to the "eq1$d$," "eq2$d$," "eq3$d$," and "eq4$d$" second pressure decreasing equalization step.

The process may further comprise a third pressure decreasing equalization step and a third pressure increasing equalization step, wherein the third pressure decreasing equalization step is after the second pressure decreasing equalization step and before the blowdown step (d) in the repetitive cycle, and wherein the third pressure increasing equalization step is after the evacuation step (e) and before the second pressure increasing equalization step.

The third pressure decreasing equalization step, if present, comprises co-currently withdrawing a third pressure equalization gas from an adsorption bed undergoing the third pressure decreasing equalization step, and passing the third pressure equalization gas to an adsorption bed undergoing the third pressure increasing equalization step thereby equalizing the pressure between the adsorption bed undergoing the third pressure decreasing equalization step and the adsorption bed undergoing the third pressure increasing equalization step. The third pressure decreasing equalization step is represented by one of "eq1$d$," "eq2$d$," "eq3$d$," and "eq4$d$" in FIGS. 2-15, corresponding to an equalization step that takes place after the second pressure decreasing equalization step and before the blowdown step (d).

The third pressure increasing equalization step, if present, comprises counter-currently introducing the third pressure equalization gas from the adsorption bed undergoing the third pressure decreasing equalization step into the adsorption bed undergoing the third pressure increasing equalization step. The third pressure increasing equalization step is represented by one of "eq1r," "eq2r," "eq3r," and "eq4r" in FIGS. 2-15, corresponding to an equalization step that takes place after the evacuation step (e) and before the second pressure increasing equalization step and also corresponding to the step complementary to the "eq1d," "eq2d," "eq3d," and "eq4d" third pressure decreasing equalization step.

The process may further comprise a fourth pressure decreasing equalization step and a fourth pressure increasing equalization step, wherein the fourth pressure decreasing equalization step is after the third pressure decreasing equalization step and before the blowdown step (d) in the repetitive cycle, and wherein the fourth pressure increasing equalization step is after the evacuation step (e) and before the third pressure increasing equalization step.

The fourth pressure decreasing equalization step, if present, comprises co-currently withdrawing a fourth pressure equalization gas from an adsorption bed undergoing the fourth pressure decreasing equalization step, and passing the fourth pressure equalization gas to an adsorption bed undergoing the fourth pressure increasing equalization step thereby equalizing the pressure between the adsorption bed undergoing the fourth pressure decreasing equalization step and the adsorption bed undergoing the fourth pressure increasing equalization step. The fourth pressure decreasing equalization step is represented by one of "eq1d," "eq2d," "eq3d," and "eq4d" in FIGS. 2-15, corresponding to an equalization step that takes place after the third pressure decreasing equalization step and before the blowdown step (d).

The fourth pressure increasing equalization step comprises counter-currently introducing the fourth pressure equalization gas from the adsorption bed undergoing the fourth pressure decreasing equalization step into the adsorption bed undergoing the fourth pressure increasing equalization step. The fourth pressure increasing equalization step is represented by one of "eq1r," "eq2r," "eq3r," and "eq4r" in FIGS. 2-15, corresponding to an equalization step that takes place after the evacuation step (e) and before the third pressure increasing equalization step and also corresponding to the step complementary to the "eq1d," "eq2d," "eq3d," and "eq4d" fourth pressure decreasing equalization step.

The pressure equalization step just before the repressurization step (g) may include gas assist from the feed gas and/or effluent gas from the adsorption bed undergoing the feed step. In this alternative, the process may further comprise a second pressure decreasing equalization step and a second pressure increasing equalization step, wherein the second pressure decreasing equalization step is after the feed step (a) and before the rinse step (b) in the repetitive cycle, and wherein the second pressure increasing equalization step is after the pressure increasing equalization step and before the repressurization step (g) in the repetitive cycle.

In this alternative with gas assist, the second pressure decreasing equalization step is represented by one of "eq1d," "eq2d," "eq3d," and "eq4d" in FIGS. 2-15, corresponding to an equalization step that takes place after the feed step and before the rinse step.

The second pressure increasing equalization step comprises counter-currently introducing the second pressure equalization gas from the adsorption bed undergoing the second pressure decreasing equalization step while simultaneously at least one of (i) co-currently introducing the feed gas into the adsorption bed undergoing the second pressure increasing equalization step, and (ii) counter-currently introducing a portion of the effluent gas from the adsorption bed undergoing the feed step into the adsorption bed undergoing the second pressure increasing equalization step. The second pressure increasing equalization step is represented by one of "eq1r," "eq2r," "eq3r," and "eq4r" in FIGS. 2-15, corresponding to an equalization step that takes place after the pressure increasing equalization step and before the repressurization step (g) and also corresponding to the step complementary to the "eq1d," "eq2d," "eq3d," and "eq4d" second pressure decreasing equalization step.

The process alternative with gas assist during one of the pressure increasing equalization steps may further comprise a third pressure decreasing equalization step and a third pressure increasing equalization step. The third pressure decreasing equalization step is after the second pressure decreasing equalization step and before the blowdown step (d) in the repetitive cycle, and the third pressure increasing equalization step is after the evacuation step (e) and before the second pressure increasing equalization step in the repetitive cycle. Otherwise the third pressure decreasing equalization step and third pressure increasing equalization step are as described above.

The process alternative with gas assist during one of the pressure increasing equalization steps may further comprise a fourth pressure decreasing equalization step and a fourth pressure increasing equalization step. The fourth pressure decreasing equalization step is after the third pressure decreasing equalization step and before the blowdown step (d) in the repetitive cycle, and the fourth pressure increasing equalization step is after the evacuation step (e) and before the third pressure increasing equalization step in the repetitive cycle. Otherwise the fourth pressure decreasing equalization step and fourth pressure increasing equalization step are as described above.

The process alternatives described above with 3 or more pressure decreasing equalization steps and 3 or more pressure increasing equalization steps, with or without gas assist during one of the pressure increasing equalization steps may further comprise a provide purge step and a purge step. The provide purge step is after the third pressure decreasing equalization step or the fourth pressure decreasing equalization step and before the blowdown step (d) in the repetitive cycle. The purge step is after the evacuation step (e) and before the third pressure increasing equalization step or fourth pressure increasing equalization step.

The provide purge step comprises co-currently withdrawing a purge gas from an adsorption bed undergoing the provide purge step, and passing the purge gas to an adsorption bed undergoing the purge step.

The purge step comprises counter-currently introducing the purge gas from the adsorption bed undergoing the provide purge step into the adsorption bed undergoing the purge step while counter-currently withdrawing a purge gas effluent comprising the first gas from the adsorption bed undergoing the purge step at the evacuation pressure and combining the purge gas effluent with the product stream.

In some alternatives, the rinse gas effluent may be available at a pressure suitable for repressurization throughout the cycle. At least a portion of the rinse gas effluent from the adsorption bed undergoing the rinse step may then also be counter-currently introduced into the adsorption bed undergoing the repressurization step in addition to the feed gas mixture and/or the effluent gas depleted in the first gas from the adsorption bed undergoing the feed step. For example, the rinse gas effluent may be blended with the effluent gas from another adsorption bed undergoing the feed step and a portion of the blend used to increase the pressure in the adsorption bed undergoing the repressurization step (g).

EXAMPLES

The process is further described by way of the following illustrative examples. The present invention will be better understood with reference to the following examples, which are intended to illustrate, but not to limit the scope of the invention. The invention is solely defined by the claims.

Example 1

5 Bed Cycle

FIG. 1 shows a process flow diagram for an adsorption bed system suitable for a 5 bed cycle according to the process.

Figures 2, 3:
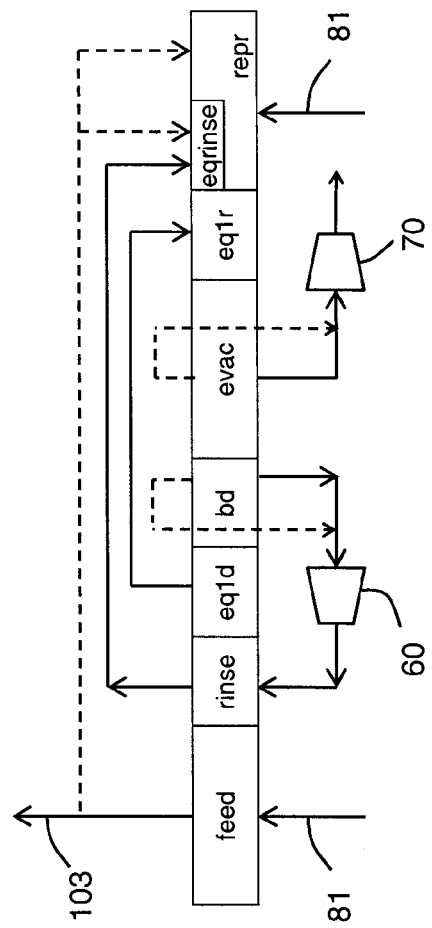
FIG. 2 is a cycle chart for a 5 bed adsorption cycle.
FIG. 3 is a schematic illustrating the relationship of gas flows for the cycle chart of FIG. 2.

FIG. 2 shows a cycle chart for a 5 bed cycle according to the process. The 5 bed cycle shown in FIG. 2 illustrates the features of aspect 1 and the additional features of aspects 8-15.

As shown in FIG. 2, for the exemplary 5 bed cycle, each adsorption bed undergoes a feed step (feed), followed by a rinse step (rinse), a pressure decreasing equalization step (eq1d), a blowdown step (bd), an evacuation step (evac), a pressure increasing equalization step (eq1r), rinse gas effluent equalization step (eqrinse), and a repressurization step (repr). The rinse gas effluent equalization step may include an optional simultaneous introduction of feed gas and/or a portion of the effluent gas from the adsorption bed undergoing the feed step. The repressurization step includes introduction of feed gas and/or a portion of the effluent gas from the adsorption bed undergoing the feed step.

FIG. 3 shows a schematic illustrating the relationship of the gas flows for each step. A feed gas mixture comprising a first gas ($CO_2$) and a second gas ($H_2$) is introduced into the bed undergoing the feed step (feed) through conduit 81 and an effluent gas depleted in the first gas is withdrawn from the adsorption bed undergoing the feed step. A portion of the effluent gas from the feed step is optionally counter-currently introduced and/or feed gas is optionally co-currently introduced into an adsorption bed undergoing the rinse gas effluent equalization step (eqrinse).

Blowdown gas is counter-currently withdrawn from an adsorption bed undergoing the blowdown step (bd), the blowdown gas is compressed in compressor 60, and the compressed gas is co-currently introduced as a rinse gas into the adsorption bed undergoing the rinse step (rinse). Alternatively or additionally, as depicted by the dashed lines, blowdown gas may be co-currently withdrawn from the adsorption bed undergoing the blowdown step (bd). Rinse gas effluent is co-currently withdrawn from the adsorption bed undergoing the rinse step and counter-currently introduced into the adsorption bed undergoing the rinse gas effluent equalization step (eqrinse).

Compressor 60 may be a single stage or multi-stage compressor. Compressor 60 is preferably a non-lubricated machine because the compressed gas will be returned to the adsorption bed undergoing a rinse step and any contained oil could damage the adsorbent.

A pressure equalization gas is co-currently withdrawn from an adsorption bed undergoing a pressure decreasing equalization step (eq1d) and counter-currently introduced into an adsorption bed undergoing a pressure increasing equalization step (eq1r).

A product stream comprising the first gas ($CO_2$) is counter-currently withdrawn from an adsorption bed undergoing the evacuation step (evac) and passed to compressor 70 to increase the pressure of the product stream.

The repressurization step (repr) includes introduction of feed gas (shown in solid line) and/or a portion of the effluent gas from the adsorption bed undergoing the feed step (shown in dashed line).

With reference to FIG. 1, the feed gas mixture is introduced into the system via conduit 81 to feed gas header 4. Effluent gas depleted in the first gas ($CO_2$) is withdrawn via effluent gas header 1 and removed from the system via conduit 103. A product stream comprising the first gas ($CO_2$) passes through product gas header 7 and is withdrawn from the system via compressor 70 and conduit 101. Blowdown gas header 6 provides blowdown gas to compressor 60. Compressor 60 compresses the blowdown gas to form the rinse gas. Rinse gas header 5 provides rinse gas to the adsorption vessels when undergoing the rinse step. Equalization gas is passed between adsorption beds undergoing equalization via equalization gas header 2. Rinse gas effluent is passed through rinse gas effluent header 3.

With reference to FIG. 1, for adsorption bed 10A on feed, adsorption bed 20A on rinse gas effluent equalization, adsorption bed 30A on evacuation, adsorption bed 40A on blowdown, and adsorption bed 50A on rinse, valves 11, 14, 21, 23, 37, 46, 53, and 55 are open and the remaining valves are closed. For adsorption bed 10A on feed, adsorption bed 20A on repressurization, adsorption bed 30A on pressure increasing equalization, adsorption bed 40A on evacuation, and adsorption bed 50A on pressure decreasing equalization, valves 11, 14, 21, 32, 47, 52 are open and the remaining valves are closed.

For adsorption bed 20A on feed, adsorption bed 30A on rinse gas effluent equalization, adsorption bed 40A on evacuation, adsorption bed 50A on blowdown, and adsorption bed 10A on rinse, valves 13, 15, 21, 24, 31, 33, 47, and 56 are open and the remaining valves are closed. For adsorption bed 20A on feed, adsorption bed 30A on repressurization, adsorption bed 40A on pressure increasing equalization, adsorption bed 50A on evacuation, and adsorption bed 10A on pressure decreasing equalization, valves 12, 21, 24, 31, 42, and 57 are open and the remaining valves are closed.

For adsorption bed 30A on feed, adsorption bed 40A on rinse gas effluent equalization, adsorption bed 50A on evacuation, adsorption bed 10A on blowdown, and adsorption bed 20A on rinse, valves 16, 23, 25, 31, 34, 41, 43, and 57 are open and the remaining valves are closed. For adsorption bed 30A on feed, adsorption bed 40A on repressurization, adsorption bed 50A on pressure increasing equalization, adsorption bed 10A on evacuation, and adsorption bed 20A on pressure decreasing equalization, valves 17, 22, 31, 34, 41, and 52 are open and the remaining valves are closed.

For adsorption bed 40A on feed, adsorption bed 50A on rinse gas effluent equalization, adsorption bed 10A on evacuation, adsorption bed 20A on blowdown, and adsorption bed 30A on rinse, valves 17, 26, 33, 35, 41, 44, 51, and 53 are open and the remaining valves are closed. For adsorption bed 40A on feed, adsorption bed 50A on repressurization, adsorption bed 10A on pressure increasing equalization, adsorption bed 20A on evacuation, and adsorption bed 30A on pressure decreasing equalization, valves 12, 27, 32, 41, 44, and 51 are open and the remaining valves are closed.

For adsorption bed 50A on feed, adsorption bed 10A on rinse gas effluent equalization, adsorption bed 20A on evacuation, adsorption bed 30A on blowdown, and adsorption bed 40A on rinse, valves 11, 13, 27, 36, 43, 45, 51, and 54 are open and the remaining valves are closed. For adsorption bed 50A on feed, adsorption bed 10A on repressurization, adsorption bed 20A on pressure increasing equalization, adsorption bed 30A on evacuation, and adsorption bed 40A on pressure decreasing equalization, valves 11, 22, 37, 42, 51, and 54 are open and the remaining valves are closed.

Example 2

6 Bed Cycle

Figures 4, 5:
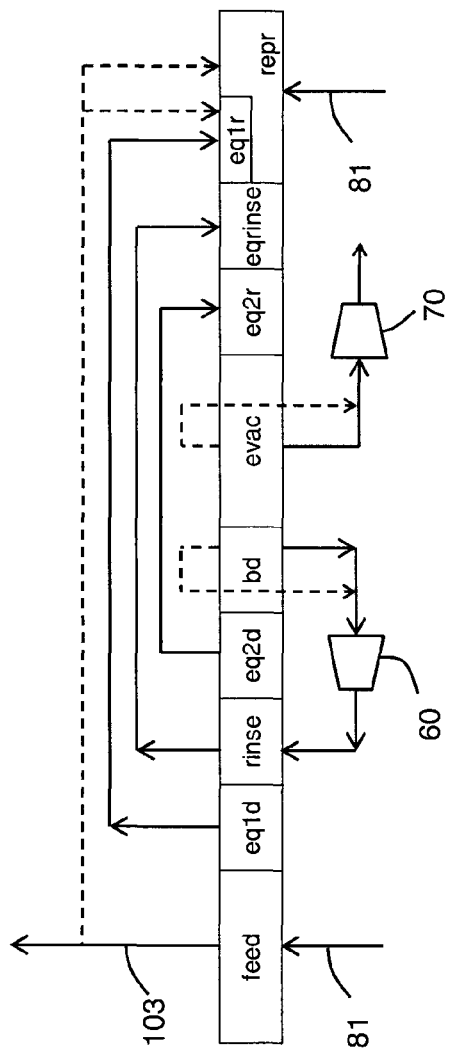
FIG. 4 is a cycle chart for a 6 bed adsorption cycle.
FIG. 5 is a schematic illustrating the relationship of gas flows for the cycle chart of FIG. 4.

FIG. 4 shows a cycle chart for a 6 bed cycle according to the process and FIG. 5 shows a schematic illustrating the relationship of the gas flows for each step. The 6 bed cycle shown in FIG. 4 illustrates the features of aspect 1 and the additional features of aspects 8-14, and 19.

A process flow diagram for the 6 bed cycle and the valve positions for each step are not provided as the skilled person can readily construct the process flow diagram and determine appropriate valve positions given the teaching of Example 1 for the 5 bed cycle without undue burden or undue experimentation.

In case of a valve failure, an adsorption system could be operated in reduced bed mode. For example, a 6 adsorption bed system could be operated using a 5 bed cycle, a 7 adsorption bed system could be operated using a 6 bed cycle, and so on.

As shown in FIG. 4, for the exemplary 6 bed cycle, each adsorption bed undergoes a feed step (feed), followed by a pressure decreasing equalization step (eq1$d$), a rinse step (rinse), another pressure decreasing equalization step (eq2$d$), a blowdown step (bd), an evacuation step (evac), a pressure increasing equalization step (eq2$r$), rinse gas effluent equalization step (eqrinse), another pressure increasing equalization step (eq1$r$), and a repressurization step (repr). The pressure increasing equalization step (eq1$r$) may include simultaneous introduction of feed gas and/or a portion of the effluent gas from the adsorption bed undergoing the feed step. The repressurization step includes introduction of feed gas and/or a portion of the effluent gas from the adsorption bed undergoing the feed step.

FIG. 5 shows a schematic illustrating the relationship of the gas flows for each step. A feed gas mixture comprising a first gas ($CO_2$) and a second gas ($H_2$) is introduced into the bed undergoing the feed step (feed) through conduit 81 and an effluent gas depleted in the first gas is withdrawn from the adsorption bed undergoing the feed step. Feed gas (shown in solid line) is co-currently introduced into an adsorption bed undergoing the repressurization step (repr). Additionally or alternatively, a portion of the effluent gas from the adsorption bed undergoing the feed step (shown in dashed line) is counter-currently introduced into an adsorption bed undergoing the repressurization step (repr).

Blowdown gas is counter-currently withdrawn from an adsorption bed undergoing the blowdown step (bd), the blowdown gas is compressed in compressor 60, and the compressed gas is co-currently introduced as a rinse gas into the adsorption bed undergoing the rinse step (rinse). Alternatively or additionally, as depicted by the dashed lines, blowdown gas may be co-currently withdrawn from the adsorption bed undergoing the blowdown step (bd). Rinse gas effluent is co-currently withdrawn from the adsorption bed undergoing the rinse step and counter-currently introduced into the adsorption bed undergoing the rinse gas effluent equalization step (eqrinse).

A pressure equalization gas is co-currently withdrawn from an adsorption bed undergoing a pressure decreasing equalization step (eq2$d$) and counter-currently introduced into an adsorption bed undergoing a pressure increasing equalization step (eq2$r$).

A pressure equalization gas is co-currently withdrawn from an adsorption bed undergoing a pressure decreasing equalization step (eq1$d$) prior to the rinse step and counter-currently introduced into an adsorption bed undergoing a pressure increasing equalization step (eq1$r$) with simultaneous introduction of feed gas and/or a portion of the effluent gas from the adsorption bed undergoing the feed step.

A benefit of providing one or more pressure decreasing equalization steps prior to the rinse step is to reduce the discharge pressure requirement of the rinse compressor 60.

A product stream comprising the first gas ($CO_2$) is counter-currently withdrawn from an adsorption bed undergoing the evacuation step (evac) and passed to compressor 70 to increase the pressure of the product stream.

The repressurization step (repr) includes introduction of feed gas and/or a portion of the effluent gas from the adsorption bed undergoing the feed step.

Example 3

7 Bed Cycle

Figures 6, 7:
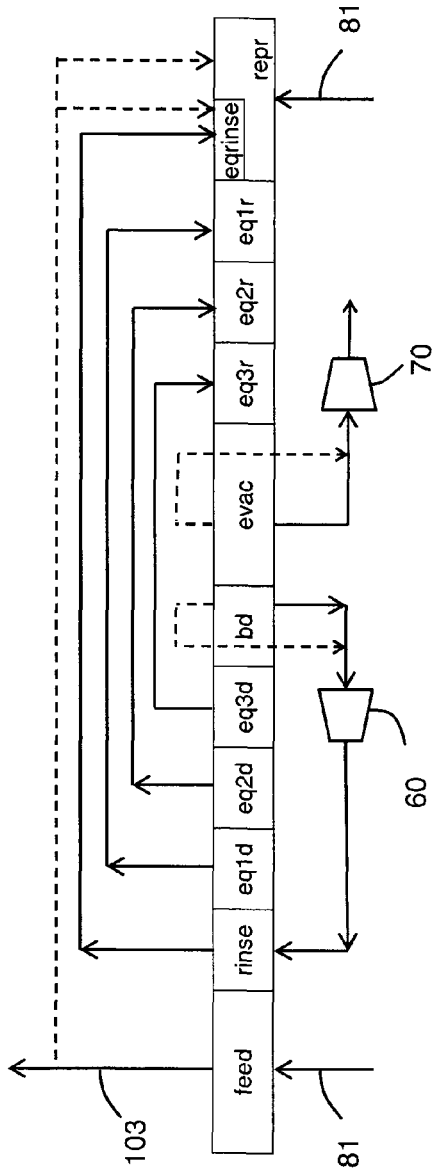
FIG. 6 is a cycle chart for a 7 bed adsorption cycle.
FIG. 7 is a schematic illustrating the relationship of gas flows for the cycle chart of FIG. 6.

FIG. 6 shows a cycle chart for a 7 bed cycle according to the process and FIG. 7 shows a schematic illustrating the relationship of the gas flows for each step. The 7 bed cycle shown in FIG. 6 illustrates the features of aspect 1 and the additional features of aspects 8-17 and 24.

A process flow diagram for the 7 bed cycle and the valve positions for each step are not provided as the skilled person can readily construct the process flow diagram and determine appropriate valve positions given the teaching of Example 1 for the 5 bed cycle without undue burden or undue experimentation.

As shown in FIG. 6, for the exemplary 7 bed cycle, each adsorption bed undergoes a feed step (feed), followed by a rinse step (rinse), a pressure decreasing equalization step (eq1$d$), another pressure decreasing equalization step (eq2$d$), another pressure decreasing equalization step (eq3$d$), a blowdown step (bd), an evacuation step (evac), a pressure increasing equalization step (eq3$r$), another pressure increasing equalization step (eq2$r$), another pressure increasing equalization step (eq1$r$), a rinse gas effluent equalization step (eqrinse), and a repressurization step (repr). The rinse gas effluent equalization step (eqrinse) may include simultaneous introduction of feed gas and/or a portion of the effluent gas from the adsorption bed undergoing the feed step. The repressurization step includes introduction of feed gas and/or a portion of the effluent gas from the adsorption bed undergoing the feed step.

FIG. 7 shows a schematic illustrating the relationship of the gas flows for each step. A feed gas mixture comprising a first gas ($CO_2$) and a second gas ($H_2$) is introduced into the bed undergoing the feed step (feed) through conduit 81 and an effluent gas depleted in the first gas is withdrawn from the adsorption bed undergoing the feed step. A portion of the effluent gas from the bed undergoing the feed step may be counter-currently introduced and/or feed gas may be co-currently introduced into an adsorption bed undergoing the rinse gas effluent equalization step (eqrinse).

Blowdown gas is counter-currently withdrawn from an adsorption bed undergoing the blowdown step (bd), the blowdown gas is compressed in compressor 60, and the compressed gas is co-currently introduced as a rinse gas into the adsorption bed undergoing the rinse step (rinse). Alternatively or additionally, as depicted by the dashed lines, blowdown gas may be co-currently withdrawn from the adsorption bed undergoing the blowdown step (bd). Rinse gas effluent is co-currently withdrawn from the adsorption bed undergoing the rinse step and may be counter-currently introduced into the adsorption bed undergoing the rinse gas effluent equalization step (eqrinse).

A pressure equalization gas is co-currently withdrawn from an adsorption bed undergoing a pressure decreasing equalization step (eq1d) and counter-currently introduced into an adsorption bed undergoing a pressure increasing equalization step (eq1r).

A pressure equalization gas is co-currently withdrawn from an adsorption bed undergoing a pressure decreasing equalization step (eq2d) and counter-currently introduced into an adsorption bed undergoing a pressure increasing equalization step (eq2r).

A pressure equalization gas is co-currently withdrawn from an adsorption bed undergoing a pressure decreasing equalization step (eq3d) and counter-currently introduced into an adsorption bed undergoing a pressure increasing equalization step (eq3r).

A product stream comprising the first gas ($CO_2$) is counter-currently withdrawn from an adsorption bed undergoing the evacuation step (evac) and passed to compressor 70 to increase the pressure of the product stream.

The repressurization step (repr) includes introduction of feed gas and/or a portion of the effluent gas from the adsorption bed undergoing the feed step.

Example 4

8 Bed Cycle

Figures 8, 9:
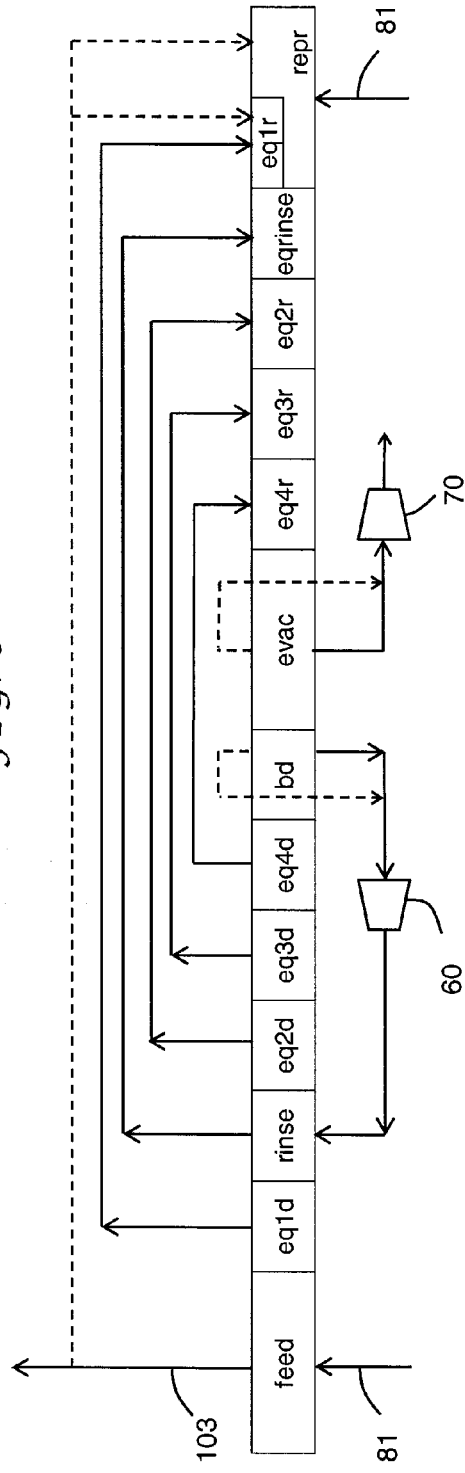
FIG. 8 is a cycle chart for an 8 bed adsorption cycle.
FIG. 9 is a schematic illustrating the relationship of gas flows for the cycle chart of FIG. 8.

FIG. 8 shows a cycle chart for an 8 bed cycle according to the process and FIG. 9 shows a schematic illustrating the relationship of the gas flows for each step. The 8 bed cycle shown in FIG. 8 illustrates the features of aspect 1 and the additional features of aspects 8-14, 16, 17, and 19-21.

A process flow diagram for the 8 bed cycle and the valve positions for each step are not provided as the skilled person can readily construct the process flow diagram and determine appropriate valve positions given the teaching of Example 1 for the 5 bed cycle without undue burden or undue experimentation.

As shown in FIG. 8, for the exemplary 8 bed cycle, each adsorption bed undergoes a feed step (feed), followed by a pressure decreasing equalization step (eq1d), a rinse step (rinse), another pressure decreasing equalization step (eq2d), another pressure decreasing equalization step (eq3d), another pressure decreasing equalization step (eq4d), a blowdown step (bd), an evacuation step (evac), a pressure increasing equalization step (eq4r), another pressure increasing equalization step (eq3r), another pressure increasing equalization step (eq2r), rinse gas effluent equalization step (eqrinse), another pressure increasing equalization step (eq1r), and a repressurization step (repr). The pressure increasing equalization step (eq1r) may include simultaneous introduction of feed gas and/or a portion of the effluent gas from the adsorption bed undergoing the feed step. The repressurization step includes introduction of feed gas and/or a portion of the effluent gas from the adsorption bed undergoing the feed step.

FIG. 9 shows a schematic illustrating the relationship of the gas flows for each step. A feed gas mixture comprising a first gas ($CO_2$) and a second gas ($H_2$) is introduced into the bed undergoing the feed step (feed) through conduit 81 and an effluent gas depleted in the first gas is withdrawn from the adsorption bed undergoing the feed step. A portion of the effluent gas is optionally counter-currently introduced and/or feed gas is optionally co-currently introduced into an adsorption bed undergoing the pressure increasing equalization step (eq1r).

Blowdown gas is counter-currently withdrawn from an adsorption bed undergoing the blowdown step (bd), the blowdown gas is compressed in compressor 60, and the compressed gas is co-currently introduced as a rinse gas into the adsorption bed undergoing the rinse step (rinse). Alternatively or additionally, as depicted by the dashed lines, blowdown gas may be co-currently withdrawn from the adsorption bed undergoing the blowdown step (bd). Rinse gas effluent is co-currently withdrawn from the adsorption bed undergoing the rinse step and counter-currently introduced into the adsorption bed undergoing the rinse gas effluent equalization step (eqrinse).

A pressure equalization gas is co-currently withdrawn from an adsorption bed undergoing a pressure decreasing equalization step (eq2d) and counter-currently introduced into an adsorption bed undergoing a pressure increasing equalization step (eq2r).

A pressure equalization gas is co-currently withdrawn from an adsorption bed undergoing a pressure decreasing equalization step (eq3d) and counter-currently introduced into an adsorption bed undergoing a pressure increasing equalization step (eq3r).

A pressure equalization gas is co-currently withdrawn from an adsorption bed undergoing a pressure decreasing equalization step (eq4d) and counter-currently introduced into an adsorption bed undergoing a pressure increasing equalization step (eq4r).

A pressure equalization gas is co-currently withdrawn from an adsorption bed undergoing a pressure decreasing equalization step (eq1d) and counter-currently introduced into an adsorption bed undergoing a pressure increasing equalization step (eq1r) with simultaneous introduction of feed gas and/or a portion of the effluent gas from the adsorption bed undergoing the feed step.

A product stream comprising the first gas ($CO_2$) is counter-currently withdrawn from an adsorption bed undergoing the evacuation step (evac) and passed to compressor 70 to increase the pressure of the product stream.

The repressurization step (repr) includes introduction of feed gas and/or a portion of the effluent gas from the adsorption bed undergoing the feed step.

Example 5

9 Bed Cycle

Figures 10, 11:
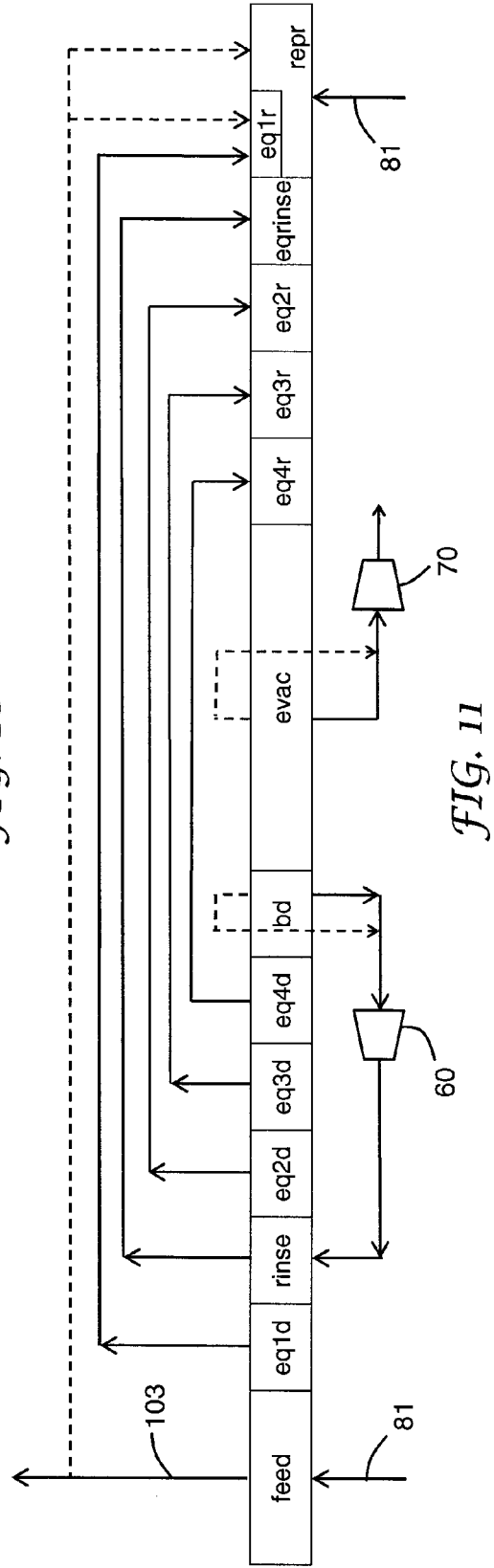
FIG. 10 is a cycle chart for a 9 bed adsorption cycle.
FIG. 11 is a schematic illustrating the relationship of gas flows for the cycle chart of FIG. 10.

FIG. 10 shows a cycle chart for a 9 bed cycle according to the process and FIG. 11 shows a schematic illustrating the relationship of the gas flows for each step. The 9 bed cycle shown in FIG. 10 illustrates the features of aspect 1 and the additional features of aspects 8-14, 16, 17, and 19-21.

A process flow diagram for the 9 bed cycle and the valve positions for each step are not provided as the skilled person can readily construct the process flow diagram and determine appropriate valve positions given the teaching of Example 1 for the 5 bed cycle without undue burden or undue experimentation.

As shown in FIG. 10, for the exemplary 9 bed cycle, each adsorption bed undergoes a feed step (feed), followed by a pressure decreasing equalization step (eq1d), a rinse step (rinse), another pressure decreasing equalization step (eq2d), another pressure decreasing equalization step (eq3d), another pressure decreasing equalization step (eq4d), a blowdown step (bd), an evacuation step (evac), a pressure increasing equalization step (eq4r), another pressure increasing equalization step (eq3r), another pressure increasing equalization step (eq2r), rinse gas effluent equalization step (eqrinse), another pressure increasing equalization step (eq1r), and a repressurization step (repr). The pressure increasing equalization step (eq1r) may include simultaneous introduction of feed gas and/or a portion of the effluent gas from the adsorption bed undergoing the feed step. The repressurization step includes introduction of feed gas and/or a portion of the effluent gas from the adsorption bed undergoing the feed step.

FIG. 11 shows a schematic illustrating the relationship of the gas flows for each step. A feed gas mixture comprising a first gas ($CO_2$) and a second gas ($H_2$) is introduced into the bed undergoing the feed step (feed) through conduit 81 and an effluent gas depleted in the first gas is withdrawn from the adsorption bed undergoing the feed step. A portion of the effluent gas from the bed undergoing the feed step may be counter-currently introduced and/or feed gas may be co-currently introduced into an adsorption bed undergoing the pressure increasing equalization step (eq1r).

Blowdown gas is counter-currently withdrawn from an adsorption bed undergoing the blowdown step (bd), the blowdown gas is compressed in compressor 60, and the compressed gas is co-currently introduced as a rinse gas into the adsorption bed undergoing the rinse step (rinse). Alternatively or additionally, as depicted by the dashed lines, blowdown gas may be co-currently withdrawn from the adsorption bed undergoing the blowdown step (bd). Rinse gas effluent is co-currently withdrawn from the adsorption bed undergoing the rinse step and counter-currently introduced into the adsorption bed undergoing the rinse gas effluent equalization step (eqrinse).

A pressure equalization gas is co-currently withdrawn from an adsorption bed undergoing a pressure decreasing equalization step (eq2d) and counter-currently introduced into an adsorption bed undergoing a pressure increasing equalization step (eq2r).

A pressure equalization gas is co-currently withdrawn from an adsorption bed undergoing a pressure decreasing equalization step (eq3d) and counter-currently introduced into an adsorption bed undergoing a pressure increasing equalization step (eq3r).

A pressure equalization gas is co-currently withdrawn from an adsorption bed undergoing a pressure decreasing equalization step (eq4d) and counter-currently introduced into an adsorption bed undergoing a pressure increasing equalization step (eq4r).

A pressure equalization gas is co-currently withdrawn from an adsorption bed undergoing a pressure decreasing equalization step (eq1d) and counter-currently introduced into an adsorption bed undergoing a pressure increasing equalization step (eq1r) with simultaneous introduction of feed gas and/or a portion of the effluent gas from the adsorption bed undergoing the feed step.

A product stream comprising the first gas ($CO_2$) is counter-currently withdrawn from an adsorption bed undergoing the evacuation step (evac) and passed to compressor 70 to increase the pressure of the product stream.

The repressurization step (repr) includes introduction of feed gas and/or a portion of the effluent gas from the adsorption bed undergoing the feed step.

Example 6

10 Bed Cycle

Figures 12, 13:
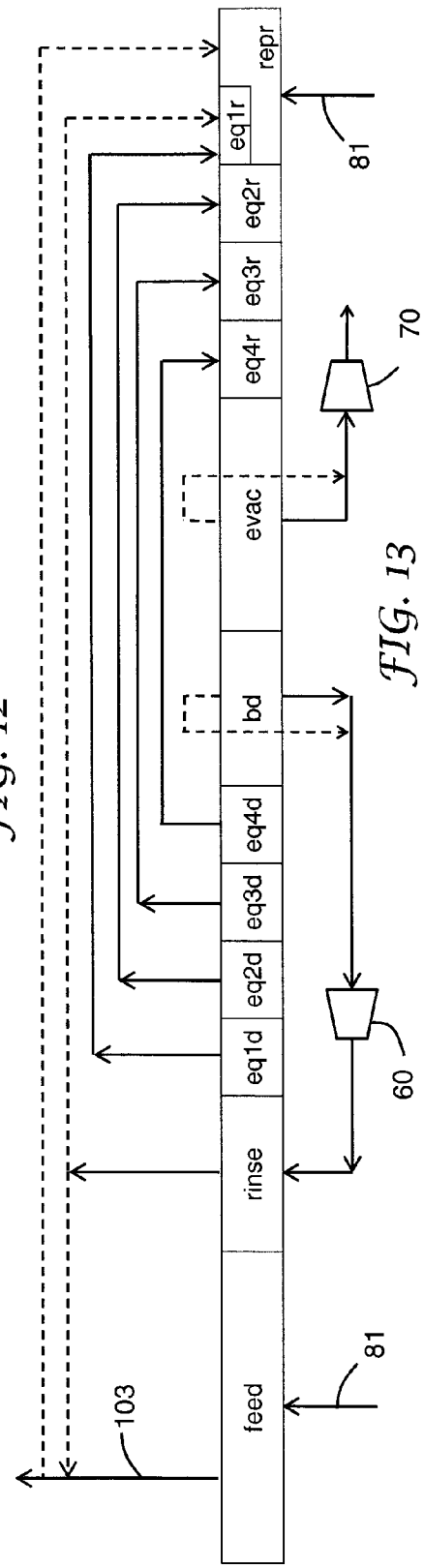
FIG. 12 is a cycle chart for a 10 bed adsorption cycle.
FIG. 13 is a schematic illustrating the relationship of gas flows for the cycle chart of FIG. 12.

FIG. 12 shows a cycle chart for a 10 bed cycle according to the process and FIG. 13 shows a schematic illustrating the relationship of the gas flows for each step. The 10 bed cycle shown in FIG. 12 illustrates the features of aspect 1 and the additional features of aspects 8-13, 16-18, and 24.

A process flow diagram for the 10 bed cycle and the valve positions for each step are not provided as the skilled person can readily construct the process flow diagram and determine appropriate valve positions given the teaching of Example 1 for the 5 bed cycle without undue burden or undue experimentation.

As shown in FIG. 12, for the exemplary 10 bed cycle, each adsorption bed undergoes a feed step (feed), followed by a rinse step (rinse), a pressure decreasing equalization step (eq1d), another pressure decreasing equalization step (eq2d), another pressure decreasing equalization step (eq3d), another pressure decreasing equalization step (eq4d), a blowdown step (bd), an evacuation step (evac), a pressure increasing equalization step (eq4r), another pressure increasing equalization step (eq3r), another pressure increasing equalization step (eq2r), another pressure increasing equalization step (eq1r), and a repressurization step (repr). The pressure increasing equalization step (eq1r) may include simultaneous introduction of feed gas and/or a portion of the effluent gas from the adsorption bed undergoing the feed step and/or a portion of the rinse gas effluent from the adsorption bed undergoing the rinse step. The repressurization step includes introduction of feed gas and/or a portion of the effluent gas from the adsorption bed undergoing the feed step and/or a portion of the rinse gas effluent from the adsorption bed undergoing the rinse step.

FIG. 13 shows a schematic illustrating the relationship of the gas flows for each step. A feed gas mixture comprising a first gas ($CO_2$) and a second gas ($H_2$) is introduced into the bed undergoing the feed step (feed) through conduit 81 and an effluent gas depleted in the first gas is withdrawn from the adsorption bed undergoing the feed step. A portion of the effluent gas may be counter-currently introduced into an adsorption bed undergoing the pressure increasing equalization step (eq1r) and the repressurization step (repr) and/or feed gas may be co-currently introduced into the adsorption bed undergoing the pressure increasing equalization step (eq1r) and the repressurization step (repr).

Blowdown gas is counter-currently withdrawn from an adsorption bed undergoing the blowdown step (bd), the blowdown gas is compressed in compressor 60, and the compressed gas is co-currently introduced as a rinse gas into the adsorption bed undergoing the rinse step (rinse). Alternatively or additionally, as depicted by the dashed lines, blowdown gas may be co-currently withdrawn from the adsorption bed undergoing the blowdown step (bd). Rinse gas effluent is co-currently withdrawn from the adsorption bed undergoing the rinse step and may be counter-currently introduced into the adsorption bed undergoing a pressure equalization step (eq1r).

When the rinse step is directly after the feed step, there are a number of options for where to send the rinse gas effluent. The rinse step may be performed at the same pressure as the feed step and the rinse gas effluent may be combined with effluent from another bed undergoing the feed step. Alternatively, the pressure during the rinse step may be allowed to drop as the bed is pressure equalized with another bed. FIG. 13 shows that the effluent gas from the rinse step can either be combined with the effluent gas from the feed step (thereby maintaining the bed undergoing the rinse step at the feed step pressure) or sent to a bed undergoing an equalization step. In another option, the rinse gas effluent flow may be restricted so that the bed undergoing the rinse step is only partially equalized (pressure difference greater than 250 kPa) with the bed receiving the rinse gas effluent.

A pressure equalization gas is co-currently withdrawn from an adsorption bed undergoing a pressure decreasing equalization step (eq2d) and counter-currently introduced into an adsorption bed undergoing a pressure increasing equalization step (eq2r).

A pressure equalization gas is co-currently withdrawn from an adsorption bed undergoing a pressure decreasing equalization step (eq3d) and counter-currently introduced into an adsorption bed undergoing a pressure increasing equalization step (eq3r).

A pressure equalization gas is co-currently withdrawn from an adsorption bed undergoing a pressure decreasing equalization step (eq4d) and counter-currently introduced into an adsorption bed undergoing a pressure increasing equalization step (eq4r).

A pressure equalization gas is co-currently withdrawn from an adsorption bed undergoing a pressure decreasing equalization step (eq1d) and counter-currently introduced into an adsorption bed undergoing a pressure increasing equalization step (eq1r) with simultaneous introduction of feed gas and/or a portion of the effluent gas from the adsorption bed undergoing the feed step and/or a portion of the rinse gas effluent from the adsorption bed undergoing the rinse step.

A product stream comprising the first gas ($CO_2$) is counter-currently withdrawn from an adsorption bed undergoing the evacuation step (evac) and passed to compressor 70 to increase the pressure of the product stream.

The repressurization step (repr) includes introduction of feed gas and/or a portion of the effluent gas from the adsorption bed undergoing the feed step.

Example 7

12 Bed Cycle

Figure 14:
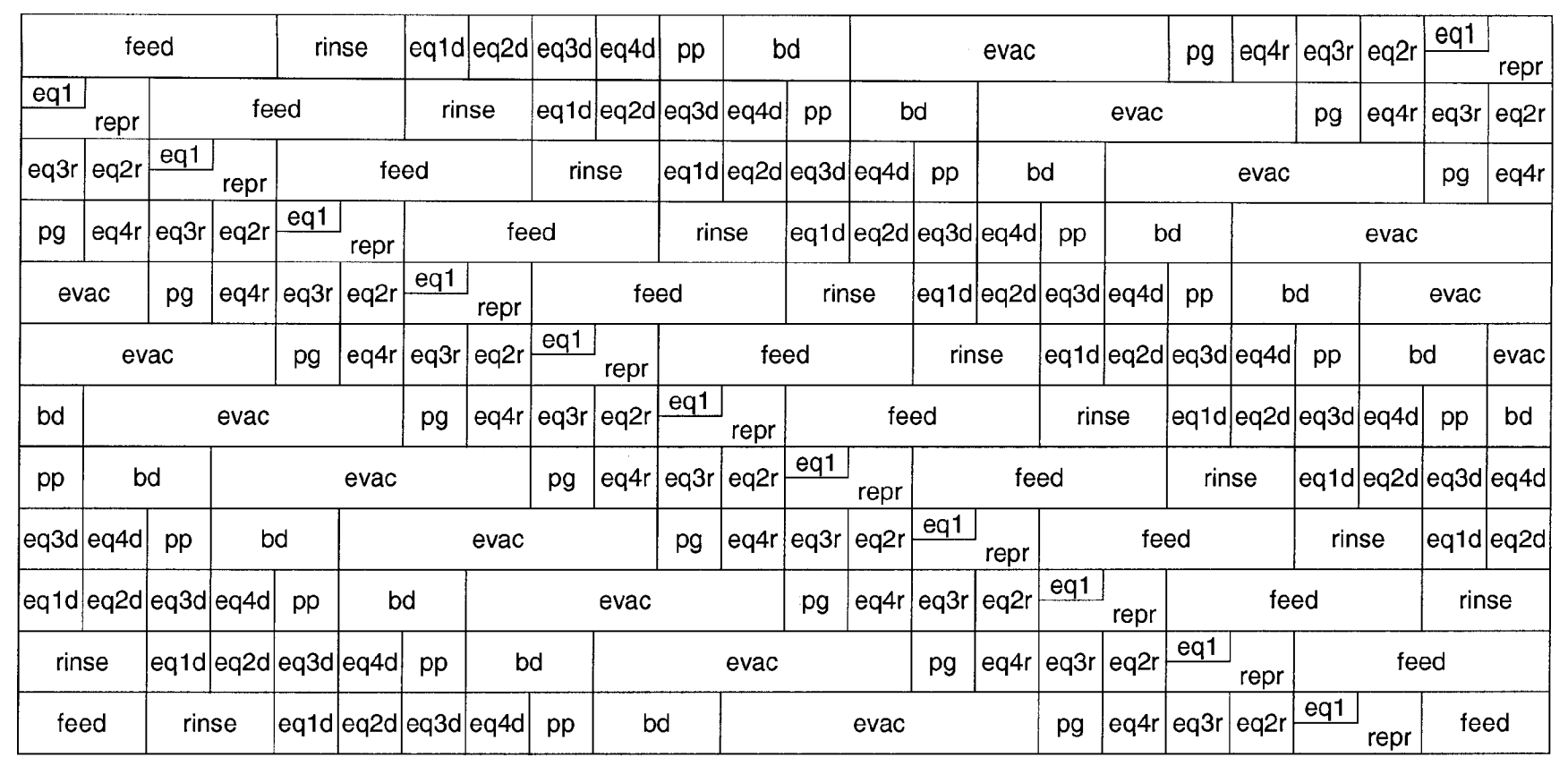
Figure 15:
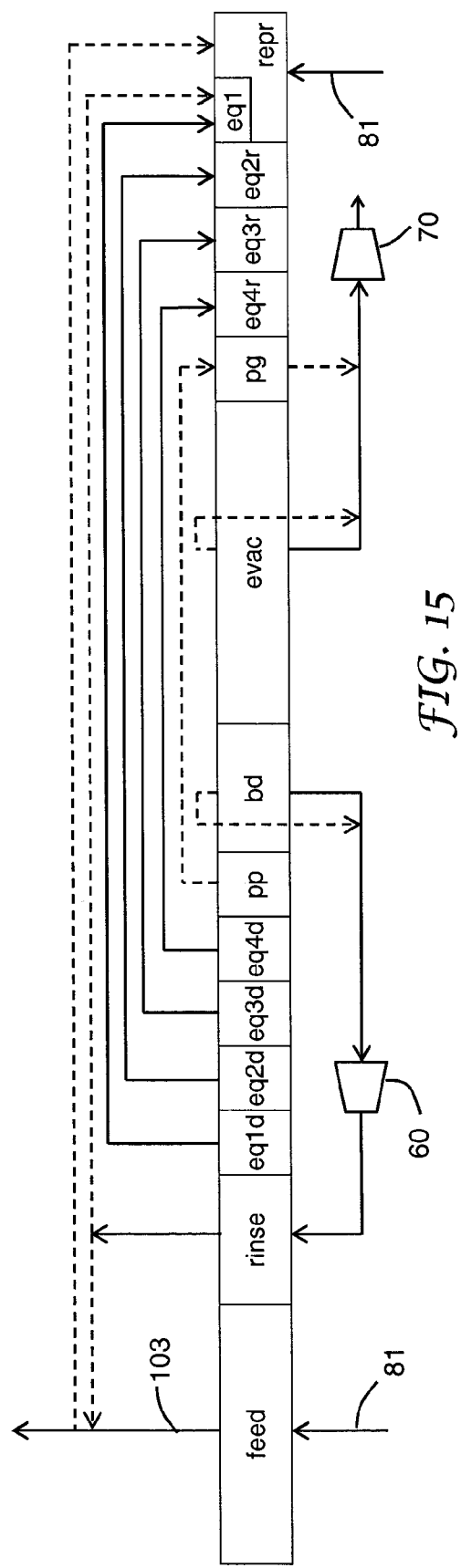
FIG. 15 is a schematic illustrating the relationship of gas flows for the cycle chart of FIG. 14.

FIG. 14 shows a cycle chart for a 12 bed cycle according to the process and FIG. 15 shows a schematic illustrating the relationship of the gas flows for each step. The 12 bed cycle shown in FIG. 14 illustrates the features of aspect 1 and the additional features of aspects 8-13, 16-18, 22, and 24.

A process flow diagram for the 12 bed cycle and the valve positions for each step are not provided as the skilled person can readily construct the process flow diagram and determine appropriate valve positions given the teaching of Example 1 for the 5 bed cycle without undue burden or undue experimentation.

As shown in FIG. 14, for the exemplary 12 bed cycle, each adsorption bed undergoes a feed step (feed), followed by a rinse step (rinse), a pressure decreasing equalization step (eq1d), another pressure decreasing equalization step (eq2d), another pressure decreasing equalization step (eq3d), another pressure decreasing equalization step (eq4d), a provide purge step (pp), a blowdown step (bd), an evacuation step (evac), a purge step (pg), a pressure increasing equalization step (eq4r), another pressure increasing equalization step (eq3r), another pressure increasing equalization step (eq2r), another pressure increasing equalization step (eq1r), and a repressurization step (repr). The pressure increasing equalization step (eq1r) may include simultaneous introduction of feed gas and/or a portion of the effluent gas from the adsorption bed undergoing the feed step and/or a portion of the rinse gas effluent from the adsorption bed undergoing the rinse step. The repressurization step includes introduction of feed gas and/or a portion of the effluent gas from the adsorption bed undergoing the feed step and/or a portion of the rinse gas effluent from the adsorption bed undergoing the rinse step.

FIG. 15 shows a schematic illustrating the relationship of the gas flows for each step. A feed gas mixture comprising a first gas ($CO_2$) and a second gas ($H_2$) is introduced into the bed undergoing the feed step (feed) through conduit 81 and an effluent gas depleted in the first gas is withdrawn from the adsorption bed undergoing the feed step. A portion of the effluent gas may be counter-currently introduced into an adsorption bed undergoing the pressure increasing equalization step (eq1r) and the repressurization step (repr) and/or feed gas may be co-currently introduced into the adsorption bed undergoing the pressure increasing equalization step (eq1r) and the repressurization step (repr).

Blowdown gas is counter-currently withdrawn from an adsorption bed undergoing the blowdown step (bd), the blowdown gas is compressed in compressor 60, and the compressed gas is co-currently introduced as a rinse gas into the adsorption bed undergoing the rinse step (rinse). Alternatively or additionally, as depicted by the dashed lines, blowdown gas may be co-currently withdrawn from the adsorption bed undergoing the blowdown step (bd). Rinse gas effluent is co-currently withdrawn from the adsorption bed undergoing the rinse step and counter-currently introduced into the adsorption bed undergoing the rinse gas effluent equalization step (eqrinse).

A pressure equalization gas is co-currently withdrawn from an adsorption bed undergoing a pressure decreasing equalization step (eq2d) and counter-currently introduced into an adsorption bed undergoing a pressure increasing equalization step (eq2r).

A pressure equalization gas is co-currently withdrawn from an adsorption bed undergoing a pressure decreasing equalization step (eq3d) and counter-currently introduced into an adsorption bed undergoing a pressure increasing equalization step (eq3r).

A pressure equalization gas is co-currently withdrawn from an adsorption bed undergoing a pressure decreasing equalization step (eq4d) and counter-currently introduced into an adsorption bed undergoing a pressure increasing equalization step (eq4r).

A pressure equalization gas is co-currently withdrawn from an adsorption bed undergoing a pressure decreasing equalization step (eq1d) and counter-currently introduced into an adsorption bed undergoing a pressure increasing equalization step (eq1r) with optional simultaneous introduction of feed gas and/or a portion of the effluent gas from the adsorption bed undergoing the feed step and/or a portion of the rinse gas effluent from the adsorption bed undergoing the rinse step.

A product stream comprising the first gas ($CO_2$) is counter-currently withdrawn from an adsorption bed undergoing the evacuation step (evac) and passed to compressor 70 to increase the pressure of the product stream.

A purge gas is co-currently withdrawn from an adsorption bed undergoing the provide purge step (pp) and the purge gas is counter-currently introduced into an adsorption bed undergoing a purge step (pg). Purge gas effluent is counter-currently withdrawn from the adsorption bed undergoing the purge step and the purge gas effluent is blended with the product gas from an adsorption bed undergoing the evacuation step and the mixture passed to the compressor 70.

The repressurization step (repr) includes introduction of feed gas and/or a portion of the effluent gas from the adsorption bed undergoing the feed step.

Example 8

5 and 6 Bed Cycle

Comparative Examples

A study was conducted to compare the performance of 5 and 6 bed cycles with and without the rinse step. FIG. 16 shows a cycle chart for a 5 bed without a rinse step and FIG. 17 shows a schematic illustrating the relationship of gas flows for each step in FIG. 16. FIG. 18 shows a cycle chart for a 6 bed without a rinse step and FIG. 19 shows a schematic illustrating the relationship of gas flows for each step in FIG. 18.

The cycles were simulated using a computer program developed to dynamically simulate cyclic adsorption processes. The composition of the feed was the same for all of the simulations and was representative of a shifted reformate from a steam methane reformer: 3715 kmol/h of 0.5% $N_2$, 3.6% CO, 6.0% $CH_4$, 16.4% $CO_2$, 73.5% $H_2$ at 38° C. and 33.3 bara.

Each of the adsorber beds was 6.1 meters (20 feet) in length and 3.4 meters (11 feet) in diameter and contains a $CO_2$ selective adsorbent. The evacuation and rinse flows were adjusted to reach a target $CO_2$ product purity level while allowing about 5% of the $CO_2$ in the feed to pass through the bed undergoing the feed step to the effluent from the feed step.

For the 5 and 6 bed cycles without a rinse step, a portion of the depressurization gas after the last equalization step (eq2d for 5 bed cycle and eq3d for 6 bed cycle) and before the blowdown step (bd) is sent back to the reformer as fuel, denoted in the figures as the "fuel" step. The fuel step is a co-current depressurization. The purity level of $CO_2$ product increases as more gas is allowed to go to "fuel."

Table 1 shows results from the simulations. As can be seen from the results, without the rinse step, the $CO_2$ recovery is much less than with the rinse step for both the 5 and 6 bed cycles. Furthermore, at 97 vol. % $CO_2$ purity, the difference in $CO_2$ recovery is even more apparent.

Another comparison was made where the feed times were varied for the 6 bed cycles without the rinse step and compared to a 6 bed cycle with the rinse step. The purity for these cases is 97 vol. % $CO_2$ and the bed size was the same for all cases.

The results clearly show that the $CO_2$ recovery and the specific power are superior for the 6 bed cycle with the rinse step as compared to the 6 bed cycle without the rinse step. The cycles according to the present invention surprisingly produce high purity $CO_2$ (>92 vol. % or >95 vol. %), with high $CO_2$ recovery (>90%), and with lower specific power than the prior art cycles.

TABLE 1

| No. of beds | Rinse Step | $CO_2$ Purity (vol. %) | $CO_2$ Recovery (%) |
|---|---|---|---|
| 5 | No | 92 | 72.4 |
| 5 | No | 95 | 67.5 |
| 5 | No | 97 | 57.1 |
| 5 | Yes | 97 | 95.2 |
| 6 | No | 92 | 78.6 |
| 6 | No | 95 | 71.5 |
| 6 | No | 97 | 63.1 |
| 6 | Yes | 97 | 95.2 |

TABLE 2

| Rinse Step | Feed Time (s) | Vacuum (bara) | Spec. Power (kW/mTPD) | $CO_2$ Recovery (%) |
|---|---|---|---|---|
| No | 146 | 0.197 | 6.4 | 52.9 |
| No | 154 | 0.165 | 6.8 | 56.3 |
| No | 162 | 0.137 | 7.3 | 60.3 |
| No | 170 | 0.112 | 7.9 | 63.1 |
| No | 178 | 0.087 | 8.9 | 65.5 |
| Yes | 168 | 0.188 | 5.9 | 95.2 |

Although the present invention has been described as to specific embodiments or examples, it is not limited thereto, but may be changed or modified into any of various other forms without departing from the scope of the invention as defined in the accompanying claims.

We claim:

1. A process for separating a first gas from a feed gas mixture comprising the first gas and a second gas in a plurality of at least five adsorption beds each containing an adsorbent selective for the first gas, the process comprising subjecting each of the adsorption beds to a repetitive cycle comprising, in sequence, (a) a feed step, (b) a rinse step, (c) a pressure decreasing equalization step, (d) a blowdown step, (e) an evacuation step, (f) a pressure increasing equalization step, and (g) a repressurization step, wherein:

the feed step (a) comprises introducing the feed gas mixture at a feed gas pressure ranging from 1 MPa to 7 MPa into an adsorption bed undergoing the feed step and adsorbing the first gas on the adsorbent in the adsorption bed undergoing the feed step while simultaneously withdrawing an effluent gas depleted in the first gas from the adsorption bed undergoing the feed step;

the rinse step (b) comprises co-currently introducing a rinse gas comprising the first gas at a rinse gas pressure ranging from 0.5 to 1 times the feed gas pressure into an adsorption bed undergoing the rinse step while simultaneously co-currently withdrawing a rinse gas effluent from the adsorption bed undergoing the rinse step;

the pressure decreasing equalization step (c) comprises co-currently withdrawing a pressure equalization gas from an adsorption bed undergoing the pressure decreasing equalization step, and passing the pressure equalization gas to an adsorption bed undergoing the pressure increasing equalization step thereby equalizing the pressure between the adsorption bed undergoing the pressure decreasing equalization step and the adsorption bed undergoing the pressure increasing equalization step;

the blowdown step (d) comprises withdrawing a blowdown gas from an adsorption bed undergoing the blowdown step and compressing the blowdown gas to increase the pressure of the blowdown gas thereby forming the rinse gas for the adsorption bed undergoing the rinse step;

the evacuation step (e) comprises withdrawing a product stream comprising the first gas from an adsorption bed undergoing the evacuation step at an evacuation pressure sufficient to desorb the first gas for forming the product stream and compressing the product stream to increase the pressure of the product stream;

the pressure increasing equalization step (f) comprises counter-currently introducing the pressure equalization gas from the adsorption bed undergoing the pressure decreasing equalization step into the adsorption bed undergoing the pressure increasing equalization step; and the repressurization step (g) comprises increasing the pressure in an adsorption bed undergoing the repressurization step until the adsorption bed undergoing the repressurization step is substantially at the feed gas pressure, by at least one of (g1) co-currently introducing the feed gas mixture into the adsorption bed undergoing the repressurization step, and (g2) counter-currently introducing a portion of the effluent gas depleted in the first gas from the adsorption bed undergoing the feed step into the adsorption bed undergoing the repressurization step.

2. The process of claim 1 wherein the first gas is $CO_2$ and the second gas is $H_2$.

3. The process of claim 2 wherein the feed gas mixture further comprises CO.

4. The process of claim 1 wherein the feed gas pressure ranges from 1.8 MPa to 3.6 MPa.

5. The process of claim 1 wherein the evacuation pressure ranges from 7 kPa to 95 kPa and wherein the blowdown gas is withdrawn from the adsorption bed undergoing the blowdown step until the pressure in the adsorption bed undergoing the blowdown step reaches a blowdown pressure ranging from 100 kPa to 500 kPa.

6. The process of claim 1 wherein the repetitive cycle further comprises a rinse gas effluent equalization step, wherein the rinse gas effluent equalization step is after the pressure increasing equalization step (f) and before repressurization step (g) in the repetitive cycle, wherein:
the rinse gas effluent equalization step comprises counter-currently introducing at least a portion of the rinse gas effluent from the adsorption bed undergoing the rinse step into an adsorption bed undergoing the rinse gas effluent equalization step.

7. The process of claim 1 wherein the repetitive cycle further comprises a rinse gas effluent equalization step, wherein the rinse gas effluent equalization step is after the pressure increasing equalization step (f) and before repressurization step (g) in the repetitive cycle, wherein:
the rinse gas effluent equalization step comprises counter-currently introducing at least a portion of the rinse gas effluent from the adsorption bed undergoing the rinse step into an adsorption bed undergoing the rinse gas effluent equalization step while simultaneously at least one of (i) co-currently introducing the feed gas into the adsorption bed undergoing the rinse gas effluent equalization step, and (ii) counter-currently introducing a portion of the effluent gas from the adsorption bed undergoing the feed step into the adsorption bed undergoing the rinse gas effluent equalization step.

8. The process of claim 1 wherein the repetitive cycle further comprises a second pressure decreasing equalization step and a second pressure increasing equalization step, wherein the second pressure decreasing equalization step is after the pressure decreasing equalization step (c) and before the blowdown step (d) in the repetitive cycle, wherein the second pressure increasing equalization step is after the evacuation step (e) and before the pressure increasing equalization step (f) in the repetitive cycle, wherein:
the second pressure decreasing equalization step comprises co-currently withdrawing a second pressure equalization gas from an adsorption bed undergoing the second pressure decreasing equalization step, and passing the second pressure equalization gas to an adsorption bed undergoing the second pressure increasing equalization step thereby equalizing the pressure between the adsorption bed undergoing the second pressure decreasing equalization step and the adsorption bed undergoing the second pressure increasing equalization step; and
the second pressure increasing equalization step comprises counter-currently introducing the second pressure equalization gas from the adsorption bed undergoing the second pressure decreasing equalization step into the adsorption bed undergoing the second pressure increasing equalization step.

9. The process of claim 8 wherein the repetitive cycle further comprises a third pressure decreasing equalization step and a third pressure increasing equalization step, wherein the third pressure decreasing equalization step is after the second pressure decreasing equalization step and before the blowdown step (d) in the repetitive cycle, wherein the third pressure increasing equalization step is after the evacuation step (e) and before the second pressure increasing equalization step, wherein:
the third pressure decreasing equalization step comprises co-currently withdrawing a third pressure equalization gas from an adsorption bed undergoing the third pressure decreasing equalization step, and passing the third pressure equalization gas to an adsorption bed undergoing the third pressure increasing equalization step thereby equalizing the pressure between the adsorption bed undergoing the third pressure decreasing equalization step and the adsorption bed undergoing the third pressure increasing equalization step; and
the third pressure increasing equalization step comprises counter-currently introducing the third pressure equalization gas from the adsorption bed undergoing the third pressure decreasing equalization step into the adsorption bed undergoing the third pressure increasing equalization step.

10. The process of claim 9 wherein the repetitive cycle further comprises a fourth pressure decreasing equalization step and a fourth pressure increasing equalization step, wherein the fourth pressure decreasing equalization step is after the third pressure decreasing equalization step and before the blowdown step (d) in the repetitive cycle, wherein the fourth pressure increasing equalization step is after the evacuation step (e) and before the third pressure increasing equalization step, wherein:
the fourth pressure decreasing equalization step comprises co-currently withdrawing a fourth pressure equalization gas from an adsorption bed undergoing the fourth pressure decreasing equalization step, and passing the fourth pressure equalization gas to an adsorption bed undergoing the fourth pressure increasing equalization step thereby equalizing the pressure between the adsorption bed undergoing the fourth pressure decreasing equalization step and the adsorption bed undergoing the fourth pressure increasing equalization step; and
the fourth pressure increasing equalization step comprises counter-currently introducing the fourth pressure equalization gas from the adsorption bed undergoing the fourth pressure decreasing equalization step into the adsorption bed undergoing the fourth pressure increasing equalization step.

11. The process of claim 1 wherein the repetitive cycle further comprises a second pressure decreasing equalization step and a second pressure increasing equalization step, wherein the second pressure decreasing equalization step is after the feed step (a) and before the rinse step (b) in the repetitive cycle, wherein the second pressure increasing equalization step is after the pressure increasing equalization step and before the repressurization step (g) in the repetitive cycle, wherein:

the second pressure decreasing equalization step comprises co-currently withdrawing a second pressure equalization gas from an adsorption bed undergoing the second pressure decreasing equalization step, and passing the second pressure equalization gas to an adsorption bed undergoing the second pressure increasing equalization step thereby equalizing the pressure between the adsorption bed undergoing the second pressure decreasing equalization step and the adsorption bed undergoing the second pressure increasing equalization step; and the second pressure increasing equalization step comprises counter-currently introducing the second pressure equalization gas from the adsorption bed undergoing the second pressure decreasing equalization step while simultaneously at least one of (i) co-currently introducing the feed gas into the adsorption bed undergoing the second pressure increasing equalization step, and (ii) counter-currently introducing a portion of the effluent gas from the adsorption bed undergoing the feed step into the adsorption bed undergoing the second pressure increasing equalization step.

12. The process of claim 11 wherein the repetitive cycle further comprises a third pressure decreasing equalization step and a third pressure increasing equalization step, wherein the third pressure decreasing equalization step is after the second pressure decreasing equalization step and before the blowdown step (d) in the repetitive cycle, wherein the third pressure increasing equalization step is after the evacuation step (e) and before the second pressure increasing equalization step in the repetitive cycle, wherein:

the third pressure decreasing equalization step comprises co-currently withdrawing a third pressure equalization gas from an adsorption bed undergoing the third pressure decreasing equalization step, and passing the third pressure equalization gas to an adsorption bed undergoing the third pressure increasing equalization step thereby equalizing the pressure between the adsorption bed undergoing the third pressure decreasing equalization step and the adsorption bed undergoing the third pressure increasing equalization step; and the third pressure increasing equalization step comprises counter-currently introducing the third pressure equalization gas from the adsorption bed undergoing the third pressure decreasing equalization step into the adsorption bed undergoing the third pressure increasing equalization step.

13. The process of claim 12 wherein the repetitive cycle further comprises a fourth pressure decreasing equalization step and a fourth pressure increasing equalization step, wherein the fourth pressure decreasing equalization step is after the third pressure decreasing equalization step and before the blowdown step (d) in the repetitive cycle, wherein the fourth pressure increasing equalization step is after the evacuation step (e) and before the third pressure increasing equalization step, wherein:

the fourth pressure decreasing equalization step comprises co-currently withdrawing a fourth pressure equalization gas from an adsorption bed undergoing the fourth pressure decreasing equalization step, and passing the fourth pressure equalization gas to an adsorption bed undergoing the fourth pressure increasing equalization step thereby equalizing the pressure between the adsorption bed undergoing the fourth pressure decreasing equalization step and the adsorption bed undergoing the fourth pressure increasing equalization step; and the fourth pressure increasing equalization step comprises counter-currently introducing the fourth pressure equalization gas from the adsorption bed undergoing the fourth pressure decreasing equalization step into the adsorption bed undergoing the fourth pressure increasing equalization step.

14. The process of claim 9 wherein the repetitive cycle further comprises a provide purge step and a purge step, wherein the provide purge step is after the third pressure decreasing equalization step or a fourth pressure decreasing equalization step and before the blowdown step (d) in the repetitive cycle, wherein the purge step is after the evacuation step (e) and before the third pressure increasing equalization step or the fourth pressure increasing equalization step, wherein:

the provide purge step comprises co-currently withdrawing a purge gas from an adsorption bed undergoing the provide purge step, and passing the purge gas to an adsorption bed undergoing the purge step; and the purge step comprises counter-currently introducing the purge gas from the adsorption bed undergoing the provide purge step into the adsorption bed undergoing the purge step while counter-currently withdrawing a purge gas effluent comprising the first gas from the adsorption bed undergoing the purge step at the evacuation pressure and combining the purge gas with the product stream.

15. The process of claim 12 wherein the repetitive cycle further comprises a provide purge step and a purge step, wherein the provide purge step is after the third pressure decreasing equalization step or a fourth pressure decreasing equalization step and before the blowdown step (d) in the repetitive cycle, wherein the purge step is after the evacuation step (e) and before the third pressure increasing equalization step or the fourth pressure increasing equalization step, wherein:

the provide purge step comprises co-currently withdrawing a purge gas from an adsorption bed undergoing the provide purge step, and passing the purge gas to an adsorption bed undergoing the purge step; and the purge step comprises counter-currently introducing the purge gas from the adsorption bed undergoing the provide purge step into the adsorption bed undergoing the purge step while counter-currently withdrawing a purge gas effluent comprising the first gas from the adsorption bed undergoing the purge step at the evacuation pressure and combining the purge gas with the product stream.

16. The process of claim 1 wherein increasing the pressure in the adsorption bed undergoing the repressurization step (g) further comprises counter-currently introducing at least a portion of the rinse gas effluent from the adsorption bed undergoing the rinse step.

\* \* \* \* \*